(12) United States Patent
Chitilian et al.

(10) Patent No.: US 8,370,464 B1
(45) Date of Patent: Feb. 5, 2013

(54) WEB-BASED SPREADSHEET INTERACTION WITH LARGE DATA SET

(75) Inventors: Varouj A. Chitilian, San Francisco, CA (US); Zachary Lloyd, New York, NY (US); Michael W. Harm, New York, NY (US)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 12/764,408

(22) Filed: Apr. 21, 2010

Related U.S. Application Data

(60) Provisional application No. 61/171,417, filed on Apr. 21, 2009.

(51) Int. Cl.
*G06F 15/173* (2006.01)
(52) U.S. Cl. .......... 709/220; 709/225; 709/228
(58) Field of Classification Search .......... 709/220, 709/225, 228; 707/729
See application file for complete search history.

(56) References Cited

U.S. PATENT DOCUMENTS

| | | | | |
|---|---|---|---|---|
| 6,615,258 | B1 * | 9/2003 | Barry et al. | 709/223 |
| 7,225,249 | B1 * | 5/2007 | Barry et al. | 709/227 |
| 2007/0150299 | A1 * | 6/2007 | Flory | 705/1 |
| 2007/0156732 | A1 * | 7/2007 | Surendran et al. | 707/101 |
| 2008/0065685 | A1 * | 3/2008 | Frank | 707/102 |
| 2011/0119265 | A1 * | 5/2011 | Shahabi et al. | 707/729 |

* cited by examiner

*Primary Examiner* — Khanh Dinh
(74) *Attorney, Agent, or Firm* — Wolff & Samson PC

(57) ABSTRACT

A computer-implemented method for presenting data is disclosed. The method includes receiving at a data server sub-system, from a browser on a remote client computing system, a request for data stored in a central data store; retrieving the requested data from the central data store and providing data corresponding to the requested data to a spreadsheet presentation sub-system that is in communication with the data server sub-system and with the browser on the remote client computing system; and providing a document key to the browser on the remote client computing system so that the browser can request from the presentation sub-system a spreadsheet document that displays the data corresponding to the requested data.

17 Claims, 17 Drawing Sheets

▼ Positive keywords

| + Add keywords | Edit ▶ | Pause | Resume | Delete | More actions ▶ |

| Keywords | Status | | | CPC | Cost | Avg. Pos |
|---|---|---|---|---|---|---|
| | | Edit keywords | | | | |
| | | See query report (selected keywords) | | | | |
| | | See query report (all keywords) | | | | |
| ☐ keyword | TBD | Copy & move (selected keywords) | | 0 | This would export stats + settings | |
| ☐ keyword | TBD | Copy & move (all keywords) | | 0 | Use-case: Export to share & do data analysis. | |
| | | Import keywords | | | | |
| | | Export keyword table ▶ | | .csv | | |
| | | Schedule recurring reports | | PDF | | |
| | | | | HTML | | |
| | | | | AES | | |
| | | | | Google Spreadsheet | | |
| | | | | Advanced options | | |

Edit keywords
Some description and also what else you can do. Edit, cut/paste, print, save as etc. Import? *Learn more.*

| | A | B | C | D |
|---|---|---|---|---|
| 1 | Keyword | Match Type | Maximum CPC | Destination URL |
| 2 | bouquet delivery | broad | $0.50 | http://www.issaquahfloristdelivers.com |
| 3 | bouquet dozen roses | broad | $0.07 | http://www.issaquahfloristdelivers.com/ca |
| 4 | bouquet floral | broad | $0.06 | http://www.issaquahfloristdelivers.com/ca |
| 5 | bouquet of flowers | broad | $0.06 | http://www.issaquahfloristdelivers.com/category.asp?rcid=83  Enabled |

Save to Google Spreadsheet with only settings (no stats)
Use-case: Finish editing keyword list later, outside of AW.

[ Save as ]  [ Import ]

FIG. 6B

▶ Positive keywords

| + Add keywords ▶ | Edit ▶ | Pause | Resume | Delete | More actions ▶ | | | | | | | | |
|---|---|---|---|---|---|---|---|---|---|---|---|---|---|
| Quick add<br>Import from file | Status | Bid<br>Max CPC | Clicks | Impr. | CTR | Avg. CPC | Cost | Avg.<br>Pos | Conv. | Conv.<br>Rate | Cost<br>Conv. | Cost<br>Conv. | |
| ☐ keyword | TBD | $00.00 | 000 | 000 | 00.0% | 00.0% | $00.00 | $00.00 | 000 | 00.0% | $00.00 | | |
| ☐ keyword | TBD | $00.00 | 000 | 000 | 00.0% | 00.0% | $00.00 | $00.00 | 000 | 00.0% | $00.00 | | |

Edit keywords
Some description and also what else you can do. Edit, cut/paste, print, save as etc. Import? *Learn more.*

[icons] [Save as] [Import]

| | A | B | C | D | E |
|---|---|---|---|---|---|
| 1 | Keyword | Match Type | Maximum CPC | Destination URL | Status |
| 2 | bouquet delivery | broad | $0.50 | http://www.issaquahfloristdelivers.com | Enabled |
| 3 | bouquet dozen roses | broad | $0.07 | http://www.issaquahfloristdelivers.com/category.asp?rcid=86 | Enabled |
| 4 | bouquet floral | broad | $0.06 | http://www.issaquahfloristdelivers.com/category.asp?rcid=50 | Enabled |
| 5 | bouquet of flowers | phrase | $0.06 | http://www.issaquahfloristdelivers.com/category.asp?rcid=83 | Enabled |

| | Home | Campaigns | Tools | | | | | |
|---|---|---|---|---|---|---|---|---|
| | | | | ▶ Reporting | ▶ Billing | ▶ Account Preferences | Search my campaign | Search |

Online
Campaign 1
Campaign 2
Campaign 3
  Ad group 3-1
  Ad group 3-2
Audio »
Video »

Help
Creating ad groups »
Discussion forum »
Quick start guide »
How to set up billing »
Why is the world flat? »
[ Search help ] [ Go ]

Online campaigns > Campaign 3
Ad group: Ad group 3-1

Mar. 3, 2008 – Apr. 1, 2008

Stylish, rugged shoes and boots
Great values for men, women
and children. Huge selection.
www.outdoors.com
Ad 1 of 1

Default bids (Max CPC) ? Edit
Search network    $1.25
Selected content placements    $1.25
Automatic content placements    $1.25

⚠ Messages (3)    Show

| Keywords | Networks | Ads |

View control ▶

Keywords trigger ads on Search network. Automatic placements and <u>12 selected placements</u> on Content network.
Edit keywords
Some description and also what else you can do. Edit, cut/paste, print, save as etc. Import? <u>Learn more.</u>
⚠ Changes could not be saved. Please correct the cells with errors and save again.

[ Save as ] [ Import ]

| | A | B | C | D | E |
|---|---|---|---|---|---|
| 1 | Keyword | Match Type | Maximum CPC | Destination URL | Status |
| 2 | bouquet delivery | broad | | http://www.issaquahfloristdelivers.com | Enabled |
| 3 | bouquet dozen roses | broad | $0.50 | http://www.issaquahfloristdelivers.com/category.asp?rcid=86 | Enabled |
| 4 | bouquet floral | broad | $0.07 | http://www.issaquahfloristdelivers.com/category.asp?rcid=50 | Enabled |
| 5 | bouquet of flowers | exact | $0.06 | http://www.issaquahfloristdelivers.com/category.asp?rcid=83 | Enabled |
| 6 | bouquet of red roses | broad | | quahfloristdelivers.com/category.asp?rcid=90 | Enabled |
| 7 | floral bouquet | broad | | quahfloristdelivers.com/category.asp?rcid=88 | Paused |
| 8 | flower shop online | broad | | quahfloristdelivers.com/category.asp?rcid=84 | Enabled |

Please specify a
keyword match type:
Broad, Phrase or Exact.

FIG. 6E

| Home | Campaigns | Tools | ▶ | Reporting | ▶ | Billing | ▶ | Account Preferences | ▶ | Search my campaign | Search |

Online
Campaign 1
Campaign 2
Campaign 3
   Ad group 3-1
   Ad group 3-2
Audio
Video
Help
Creating ad groups   >>
Discussion forum   >>
Quick start guide   >>
How to set up billing   >>
Why is the world flat?   >>
[ Search help ] [ Go ]

Online campaigns > Campaign 3
Ad group: Ad group 3-1

Stylish, rugged shoes and boots
Great values for men, women and
children. Huge selection.
www.outdoors.com
Ad 1 of 1

Default bids (Max CPC) ⓘ Edit
Search network      $1.25
Selected content placements      $1.25
Automatic content placements      $1.25
⚠ Messages (3)    Show Mar. 3, 2008 – Apr. 1, 2008

[ View control ] ▶

| Keywords | Networks | Ads |

Add keywords
Keywords trigger ads on Search network. Automatic placements and 12 selected placements on Content network.
These placements will be contextually targeted using keywords and you can adjust your bid for them. <u>Learn more.</u>
Enter as many keywords as you would like, but only one per line.

A
B
C

Want more ideas?
Try the keyword tool

| | | | Bid | | | | | | Avg. | | Cost | Cost |
|---|---|---|---|---|---|---|---|---|---|---|---|---|
| Keyword | Match Type | Maximum CPC | Destination URL | Max CPC | Clicks | Impr. | CTR | Avg. CPC | Cost | Pos | Conv. | Conv. | Rate | Conv. |

[ Save ] [ Cancel ]

| ☐ Keywords | Status | | | | | | | | | | | | |
|---|---|---|---|---|---|---|---|---|---|---|---|---|---|
| ☐ keyword | TBD | | | $00.00 | 000 | 000 | 00.0% | 00.0% | $00.00 | 000 | 000 | 00.0% | $00.00 |
| ☐ keyword | TBD | | | $00.00 | 000 | 000 | 00.0% | 00.0% | $00.00 | 000 | 000 | 00.0% | $00.00 |
| Deleted keywords | | | | | | | | | | | | | |
| Content network total | | | | $00.00 | 000 | 000 | 00.0% | 00.0% | $00.00 | 000 | 000 | 00.0% | $00.00 |
| Search network total | | | | $00.00 | 000 | 000 | 00.0% | -- | $00.00 | 000 | 000 | 00.0% | $00.00 |
| Total – all 500 keywords | $00.00 | | | | | | | | | | | | |

Show rows [ 10 ] ▶    1-10 of 27 ▲▼

FIG. 6F

WEB-BASED SPREADSHEET INTERACTION WITH LARGE DATA SET

CROSS-REFERENCE TO RELATED APPLICATIONS

This nonprovisional patent application claims the benefit of priority to U.S. Provisional Application No. 61/171,417, filed on Apr. 21, 2009, the disclosure of which is expressly incorporated herein by reference in its entirety.

TECHNICAL FIELD

This document relates to network-based delivery of electronic content.

BACKGROUND

Internet-based data services can provide users with access to enormous amounts of information. For example, search engines can identify relevant information in unstructured data, such as web pages and images, in response to search queries submitted by users. Users can also be provided access to structured data, such as pricing data for purchases products or services, data for allowing advertisers to manage on-line advertising programs (e.g., by selecting keywords and bid amounts), and other such applications. Often, such large groups of data are managed and presented via a dedicated user interface such as a "storefront" for shopping data, and other similar mechanisms.

One approach by which many people interact with large amounts of structured data is the spreadsheet application. A spreadsheet arranges data in rows and columns that define spreadsheet cells, and users may be given various options for interacting with and editing the data. For example, users may type in new data values in a cell, may globally replace data, may make computations on the data, and may perform a number of other functions. Thus, many people may prefer to use a spreadsheet as an interface component because they can use the spreadsheet flexibly without the need for special training.

SUMMARY

This document discusses system and techniques for providing access to data to users over a network. An application that manages a large data store may rely on a separate spreadsheet presentation application to present data from the data store to a user via a spreadsheet on a web page. The web page can be served by the main application, and the spreadsheet presentation application can serve the spreadsheet and related data into a frame or similar structure that is defined on the web page. The application that manages the data store can pass data that a user requests to the spreadsheet presentation application, which can populate the spreadsheet with the data so that the user can see the data and manipulate it.

In one particular implementation, the system and techniques can be used to allow advertisers to see data regarding on-line targeted advertising programs. Such programs may allow advertisers to set bid prices they are willing to pay for their advertisements, and also to identify keywords that will trigger the display of their advertisements. As advertisers learn the keywords that are most effective for them, they may want to change their chosen triggering keywords in various manners. The systems and techniques described here can allow such advertisers to review and manipulate keyword and other data across a large number of advertisements in one or more advertising campaigns.

In certain implementations, the systems and techniques described here can provide one or more benefits. For example, certain systems and techniques can be used to provide bulk data entry, updates, and deletions for a web-based application. As another example, systems and techniques can be used to provide user-customizable reporting, data analysis, and data export. Applications such as contact lists, calendars, and e-mail (to name a few possibilities) can benefit from providing advanced data manipulation and data presentation services. Such services may be provided in certain implementations by a sub-system that does not have advanced presentation capabilities, by passing data from a data store to a sub-system that does have such capabilities. As a result, an information provider can provide improved interaction to users of the system without having to fully implement a new presentation system, so that the users benefit and the provider benefits.

In one implementation, a computer-implemented method for presenting data in an on-line spreadsheet is disclosed. The method comprises receiving at a data server sub-system, from a browser on a remote client computing system, a request for data stored in a central data store; retrieving the requested data from the central data store and providing data corresponding to the requested data to a spreadsheet presentation sub-system that is in communication with the data server sub-system and with the browser on the remote client computing system; and providing a document key to the browser on the remote client computing system so that the browser can request from the presentation sub-system a spreadsheet document that displays the data corresponding to the requested data.

In another implementation, a computer-implemented system for presenting web-based spreadsheets comprises a data server sub-system programmed to communicate with a client computing device and to serve one or more web pages to the client computing device; and a spreadsheet presentation sub-system in communication with the data server sub-system to receive data from the data server sub-system and to format the data for presentation in a spreadsheet on the one or more web pages, wherein the data server system is further programmed to retrieve data form a central data store in response to a user request from the client computing device, to provide the data to the spreadsheet presentation sub-system, and to provide state information regarding the spreadsheet to the client computing device.

In yet another implementation, a computer-implemented system for presenting web-based spreadsheets is disclosed that comprises a first server system programmed to communicate with a client computing device and a data storage system, and to serve one or more web pages to the client computing device; a second server system in communication with the first server system to receive data from the first server system and to format the data for presentation in rows of a spreadsheet on the one or more web pages; and means for communicating information from the data storage system to the client computing device, and for communicating changes in the spreadsheet made at the client computing device to the data store.

The details of one or more embodiments are set forth in the accompanying drawings and the description below. Other features and advantages will be apparent from the description and drawings, and from the claims.

DESCRIPTION OF DRAWINGS

FIGS. 6A-6G are example screen shots for an advertising system that provides user interaction via a spreadsheet presentation system.

Like reference symbols in the various drawings indicate like elements.

DETAILED DESCRIPTION

This document describes systems and techniques by which a user may access documents and use such documents to edit data that is stored in a central data store. Such access may be provided by a client device running a browser application that loads a web page from the Internet. For example, the web page may include one or more embedded documents (e.g., spreadsheets, calendars, text-based documents, etc.) for providing data access. The embedded documents may be populated with data from the data store, and a user may interact with the documents and their related data. The user may also perform data operations (including bulk operations) such as adding, editing, updating, and deleting. Embedded documents may thus provide general functionality for providing access to a variety of data sources.

An embedded document may be modular, in that it may be incorporated easily in various web pages, and may include computer code for providing data access and interaction. For example, the computer code may be executed by a browser application, a client device, or a server device associated with the embedded document. Using computer code, the embedded document may communicate with a web page containing the document, with other embedded documents included by the web page, or with a server application.

In some implementations, the embedded document may be provided from a domain that differs from the domain of the provider of the main document. For example, the document may be provided from data.example.com, while an embedded spreadsheet may be provided by spreadsheet.example.com. The top-level domain of the providers may be different in certain circumstances also. Using such an approach, a server system that focuses on managing access to data but has limited capabilities for presenting the data to user can rely on another server service that has rich mechanisms for presenting data, such as a spreadsheet server system. Such splitting of responsibilities may be achieved by having each server system communicate directly with a web page—with one server system communicating with the page or a frame in the page, and the other server system communicating with a different frame in the page.

Figure 1:
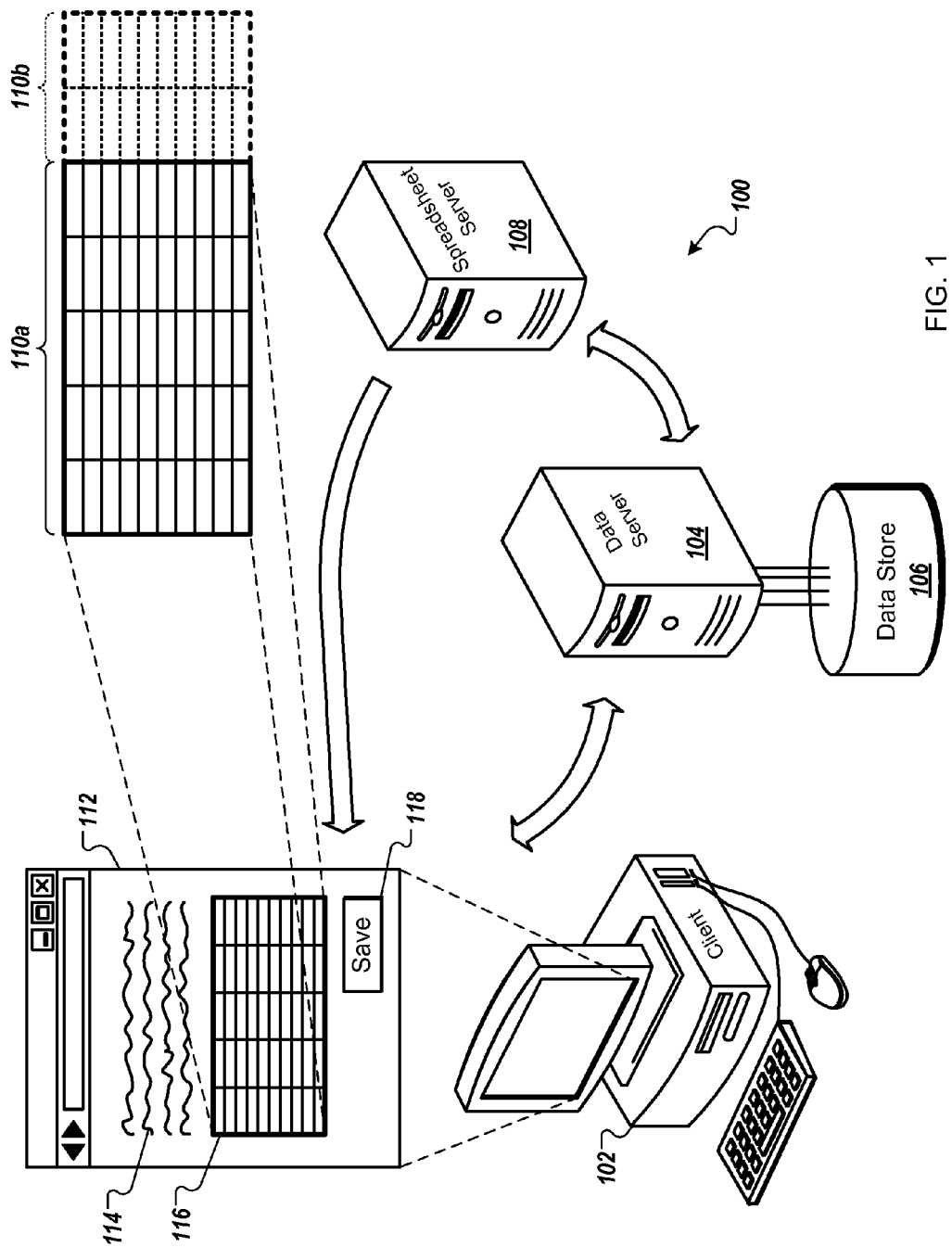
FIG. 1 is a conceptual diagram showing a system for controlling user interaction with a document displaying data from a central data store.

FIG. 1 is a conceptual diagram showing a system 100 for controlling user interaction with a document presenting data from a central data store. In general, the system 100 includes server systems that communicate with a client computing device 102 to provide data by multiple mechanisms, where one such mechanism is directly associated with the data and another mechanism is a more generic provider of data presentation capabilities, but that accesses the data via the other system. In this manner, the system that is directly associated with the data may have the data presented to and edited by a user in a superior manner without requiring new extensive new programming for presenting the data.

The client computing device 102 in this example may take a variety of forms, such as personal computer, laptop computer, and mobile devices such as personal digital assistants, notebooks, and smart phones. From the various servers that provide data for the device 102, a data server 104 communicates with a data store 106, and can in turn communicate with a spreadsheet server 108. The data server 104 can respond to a user request for information by gather data from the data store 106, providing certain data to the device 102, and providing all or some of the data (either in its original form or a reformatted form) to the spreadsheet server 108, which may in turn insert the data into the document and server the document to the device 102. For the purpose of illustration, the type of document provided by the system 100 is described as a spreadsheet, although other types of documents can also be provided. Components in the system 100 can also be connected by any appropriate kind of network, such as a network that includes the Internet.

For example, by using a web browser, the client computing device 102 can load a container document 112 form the data server 104 (which may be one or more servers that make up a sub-system, but are shown for clarity here as a single server). The container document 112 may include information 114 (e.g., user-specific data, scripting code, etc.) supplied by the data server 104. The container document 112 may also include one or more frames (e.g., iframes) for embedding documents, as illustrated by a frame 116 displayed on the page. In the present example, code running in the frame 116 may reference a document server (e.g., the spreadsheet server 108) and the document server may supply a document for presentation in the frame, where the document is represented in the figure by a set of visible spreadsheet cells 110a and a set of hidden spreadsheet cells 110b (where each set of cells in this example is defined by one or more spreadsheet columns).

In some implementations, the client computing device 102 may provide an embedded document with data. For example, upon receiving the document, the container document 112 can request for the data server 104 or some other server to retrieve data from the data store 106. For example, a user of device 102 may request to see a presentation of a large amount of structured data relating to their account on an internet service associated with data server 104.

In some implementations, the document server (e.g., the spreadsheet server 108) may serve the document and then may supply data to the document. For example, code in the container document 112 can request data from the data server 104, which may cause the data server 104 to provide data from the data store 106 to the spreadsheet server 108. The spreadsheet server 108 can create a spreadsheet document populated with data provided by the data server 104, corresponding with the request from the container document 112. Upon populating the spreadsheet, either the data server 104 or the spreadsheet server 108 can provide a document key to the web browser that displays the container document 112. In that manner, the web browser may accompany futures requests with the key, so that the data server 104 can respond to such requests without having to track the most recent state of the container document 112. The container document 112 may display the spreadsheet document in the frame 116 as it is populated, or in some implementations, after it is populated.

Where the data server 104 is configured to be stateless in regard to the spreadsheet displayed in the frame 116, spreadsheet interactions may be relatively independent of the data server 104. For example, user interaction with the spreadsheet may involve direct communication between the code in the frame 116 with the spreadsheet server 108, and need not involve the data server 104. In most situations, communication between the client computing device 102 and data server 104 may be handled by the container document 112, and communication between the client computing device 102 and the spreadsheet server 108 may be handled by the frame 116. Communication may be performed using any kind of data transfer protocol (e.g., HTML, XML, JSON, etc.).

A user of the system 100 can interact with a document (e.g., a spreadsheet) contained in the frame 116 in various ways. For example, changes (adds, edits, deletes, etc.) can be made to data associated with one or more of the visible spreadsheet cells 110a. One or more of the hidden spreadsheet cells 110b may be associated with metadata or control data related to the data in the visible spreadsheet cells 110a. For example, data contained in each spreadsheet row may be identified by one or more associated data record keys contained in the hidden spreadsheet cells 110b. As another example, each spreadsheet row may be associated with a timestamp contained in the hidden spreadsheet cells 110b representing a modification date of row data. In some implementations, as a spreadsheet row data is updated, the corresponding modification timestamp can be updated by the spreadsheet document embedded in the frame 116. The data for tracking changes to a row need not relate to time, and may use other techniques (e.g., by providing codes that are like hashes for the data in a row) to determine when changes have been made to data. Other possible types of metadata or control data include data type information, data validation rules, and data-related scripting code, to name a few possibilities.

A user of the system 100 can elect to save changes to an embedded document (e.g., a spreadsheet) contained in the frame 116 by pressing the save button 118. In this example, the save button 118 resides in the container document rather than in the frame 116. Pressing of the save button may cause a communication to be made from the browser 112 to the data server 104 in this example to start a series of operations so that changes to data in the spreadsheet. Such operations may occur, in certain circumstances, even where the data server 104 (which may be more generally a data server system) does not store state information for the spreadsheet.

In some implementations, state information for a spreadsheet may be tracked by providing to the client computing device 102 a timestamp that reflects when the spreadsheet server 108 was last synchronized with the data server 104. The client computing device 102, when it wants to execute a function such as a save function, may pass information to the data server 104, including the synchronization timestamp. The data server 104 may forward the information to the spreadsheet server 108, which can use the document key to identify the corresponding spreadsheet document. Changes to data associated with the spreadsheet document can be identified by the spreadsheet server 108, for example, by comparing the synchronization timestamp with the timestamp corresponding to the initiation of a save operation. In some implementations, changes may be identified and validations may be performed by the spreadsheet server 108 (or by the spreadsheet server 108 in coordination with the data server 104) using control data included in any of the cells from the hidden spreadsheet columns 110b.

Information related to data changes may be passed from the spreadsheet server 108 to the data server 104. The data may be passed according to an application programming interface to which the two servers are programmed so that the data server 104 can properly handle the data that it is passed. The data server 104, for example, can convert the data that indicates changes to the spreadsheet document and can update the data in the data store 106. For example, data identifiers (e.g., record keys) can be used by the data server 104 for locating and updating data in the data store 106. The data server 104 can use such keys to map changes in the spreadsheet to corresponding data in the data store 106 that may be stored in a substantially different format.

In some implementations, the container document 108 (e.g., a web page) and the frame 116 may reference servers associated with different Internet domains. For example, the container data server 104 may operate through and communicate with the browser via a domain such as data.example.com. The embedded document may in turn communicate with the spreadsheet server 108 via the domain spreadsheet.example.com.

Where the container document 108 and the frame 116 reference two different domains, communication between the container document 108 and the frame 116 may be accomplished by using one or more cross-domain communication techniques. Any appropriate kind of cross-domain communication technique may be used, including, but not limited to, JavaScript Object Notation with Padding (JSONP), a JavaScript Client Library, a relay file served from a client domain, or a combination of techniques.

Although the relationship between data presentations at the client computing device 102 by the data server 104 and the spreadsheet server 108 as shown in FIG. 1 could be described as a parent-child relationship (for example, the information 114 received by the client computing device 102 from the data server 104 may be displayed by the container document 112, and information received by the client computing device 102 from the spreadsheet server 108 may be displayed by the frame 116 belonging to the container document 112), in some implementations the relationship may assume a different form. For example, information from the data server 104 and the spreadsheet server 108 may be presented in frames on a common web page, representing a sibling relationship between the frames. Any appropriate number of frames may be included on a web page, representing any relevant number of data sources. As cross-domain communication techniques may be used for communication between a web page and a frame, similar techniques may be used for communication between frames. For example, a calendar embedded into a webpage may communicate with a spreadsheet embedded in the webpage. In the present example, interaction or data modification related to one embedded document can be reflected in the other embedded document. For instance, as a user selects a date from the embedded calendar, information related to the user and the selected date can be communicated to the embedded spreadsheet, which can load data associated with the user and selected date into spreadsheet cells. For example, a user may drag across a range of dates in a calendar application, and the selected range may be communicated to the spreadsheet application so that the spreadsheet server 108 causes the data it serves to be filtered to the relevant selected date range.

In one particular implementation, the system 100 can be used to permit on-line advertisers to interacts with their advertising data, such as to change their bids for targeted advertisements or to change their keywords for triggering hits for such advertisements. For example, data such as advertising keywords and destination URLs can be provided by the data store 106. Because a customer may associate thousands of keywords with an advertising program, and because a customer may be familiar with spreadsheet operations, a spreadsheet interface for bulk manipulation of the data may be useful. A web page (e.g., the container document 112) can include an embedded spreadsheet document (e.g., within the frame 116) for bulk manipulation of the data. For example, the data server 104 can provide keyword-related data from the data store 106, and the spreadsheet server 108 can provide the embedded spreadsheet document and also populate the document with the relevant data. Common spreadsheet operations such as editing cells, clearing cells, adding rows, removing rows, copying down, copy/paste, undo, and redo (to name a few examples) may be provided to a user for data manipulation. Modified keyword-related data can be sent to and updated by the data server 104 and the data store 106.

Figure 2A:
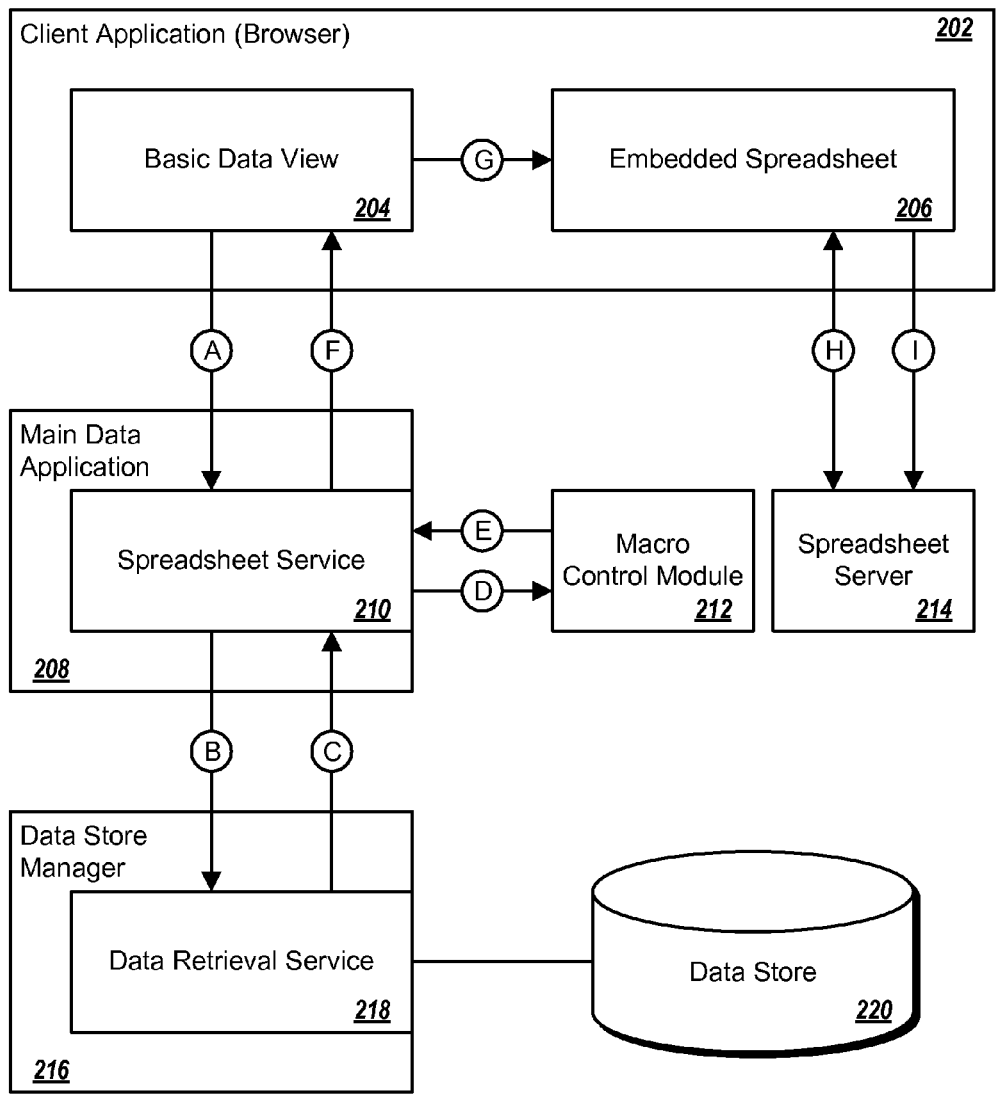
FIGS. 2A and 2B are schematic diagrams that show information flow for populating a spreadsheet using on-line applications.
Figure 2B:
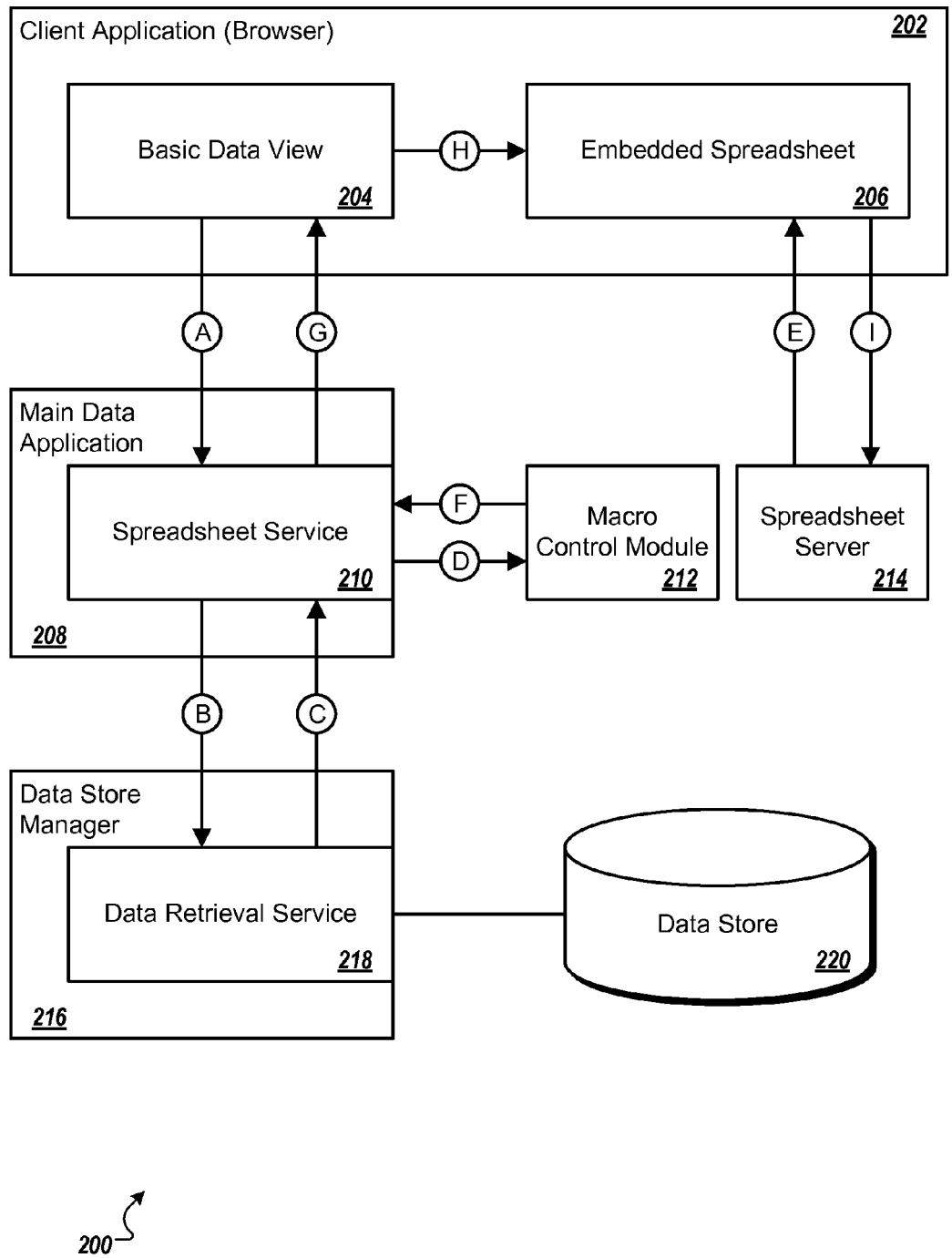

FIGS. 2a and 2b are schematic diagrams of a system 200 that show information flow for populating a document using an on-line application. For example, the document may be a spreadsheet embedded in a web browser frame. In some implementations, other types of Internet-accessible documents may be populated, such as calendars, text documents, or editable graphics files, to name a few examples. In general, the system 200 can enable a user to view and manipulate data provided by a server via a network such as the Internet using a portable program module (e.g., a web gadget or widget) or some other type of embeddable web application or document. In some implementations, the data and the portable program module may be hosted on different servers or on different Internet domains.

The system 200 can include a client application (e.g., a browser) 202, a main data application 208, a macro control module 212, a spreadsheet server 214, a data store manager 216, and a data store 220. In some implementations, components included in the system 200 may run on computing devices and servers similar to the computing devices and servers shown in FIG. 1. For example, the client application 202 may run on a client similar to the client computing device 102, the main data application 208 and the data store manager 216 may run on a server similar to the data server 104, the macro control module 212 and the spreadsheet server 214 may run on a server similar to the spreadsheet server 108, and the data store 220 may be similar to the data store 106. In some implementations, the main data application 208 and the data store manager 216 may run on different servers. In some implementations, the macro control module 212 may run on a server or server sub-system that is separate from the spreadsheet server 214.

In some implementations, components in the system 200 can be hosted on one or more servers associated with different Internet domains. For example, a server hosting the main data application 208 and the data store manager 216 can be associated with a domain such as "data.example.com" and a server hosting the macro control module 212 and the spreadsheet server 214 can be associated with a domain such as "spreadsheet.example.com". In the present example, the server associated with the "data.example.com" domain may perform as a data subsystem, and the server associated with the "spreadsheet.example.com" domain may perform as a spreadsheet presentation subsystem. As shown in the system 200, both the data subsystem and the spreadsheet presentation subsystem may communicate with components included in the client application 202, without having to communicate through the other application. Components in the system 200 can communicate with each other using any appropriate kind of data transfer protocol (e.g., HTML, XML, JSON, etc.), by making remote procedure calls (e.g., Java RMI, PHPRPC, CORBA, etc.) or by using a combination of protocols and techniques.

The client application 202 can include a web browser or other kind of Internet-enabled application configured to run on a client computing device. Here, the client application 202 includes a basic data view 204 and an embedded spreadsheet 206. The basic data view 204 can be a web page or web application operating within a browser, for example. In some implementations, the basic data view 204 can manage interactions between the client application 202 and one or more services hosted by other applications, including applications running on the same or on a different computing device, and applications in the same or in a different Internet domain. The embedded spreadsheet 206, for example, may be an Internet-accessible document that can handle interactions with a user for making changes to data. The embedded spreadsheet can include visible and hidden columns, rows, and cells.

The main data application 208 can be an application configured to run on a server. The main data application 208 can handle (or forward) requests from other applications and other services in the system 200, including user interface related requests. For example, the main data application 208 can serve as a conduit or pass-through application between components in an application framework.

Here, the main data application 208 can include a spreadsheet service 210. The spreadsheet service 210 can comprise code that has been added to the main data application 208 so as to permit the main data application to provide spreadsheet functionality to the client application 202. The spreadsheet service 210 can handle requests and interactions related to a spreadsheet document, for example. In some implementations, the spreadsheet service 210 can translate or format a request from a system component and can route the translated or formatted request to another system component. For example, a data request from the basic data view 204 can be processed by the spreadsheet service 210, translated into a corresponding request for data, and routed to the data retrieval service 218. Such translating and formatting services can allow components in the system 200 using different protocols or different programming environments to communicate with each other.

The macro control module 212 can provide a set of application programming interfaces (APIs) for interacting with one or more components in the system 200. For example, the set of APIs provided by the macro control module 212 can allow an application or service to create and control the presentation of data documents such as spreadsheets. The control can include such operations as data population, retrieval, and validation, to name a few examples. In some implementations, the macro control module 212 can perform as an interface to a portable program module server, such as the spreadsheet server 214. The spreadsheet server 214 can provide spreadsheet documents that may be embedded in a web browser page, for example.

The macro control module 212 can act, in effect, as an abstraction layer between the spreadsheet server 214, and other server systems, such as the main data application 208. In such a manner, the main data application 208 may communicate with the macro control module using a simple and easy to implement command set and language, and need not concern itself with potentially more difficult interaction that would otherwise be required to communicate directly with the spreadsheet server. The macro control module can thus translate control commands for controlling the operation of spreadsheet server 214, and can also pass data back and forth between the main data application 208 and the spreadsheet server 214, either with or without making modifications to the data.

The data store manager 216 can be an application configured to run on a server. For example, the data store manager 216 can handle requests from other applications and other services in the system 200, including data-related requests, such as for retrieving or storing data. Here, the data store manager 216 can include a data retrieval service 218. For example, the data retrieval service 218 can interact with a data store 220. In some implementations, the data retrieval service 218 may provide business logic services (e.g., validation processing, data mapping, etc.). The data store 220 can be any appropriate kind of database, including, but not limited to, a relational database, an object database, or a file server. The data store 222 can provide and store any relevant kind of data, including data provided for editing in an Internet-accessible document such as a spreadsheet, and control data that can be used for tracking and validating changes to data in a spreadsheet.

One example information flow that reflects an initial request for data from the client application 202 is shown in FIG. 2A by a series of lettered process arrows A-I. Editing data related to on-line targeted advertising programs using an embedded spreadsheet document is described as an example here; however, other kinds of data may be edited and other kinds of Internet-accessible documents may be used for data presentation and editing.

As shown by process arrow A, the basic data view 204 can make a request to the spreadsheet service 210 hosted by the main data application 208. The request can include a request for data and a request for a data display medium. For example, the requested data may be keyword-related data for an advertising program, such as when a user who managers an advertising portfolio wants to review their current crop of keywords and may want to make changes to the keywords to make their advertising more effective. The requested data display medium, for example, may be a spreadsheet document or another type of document, such as a word processing document. Initially, however, the spreadsheet document may be displayed in an empty state, and the user may make selections in the main web page, as a container document, to indicate the parameters for advertising data that they would like to have retrieved and shown to them.

As shown by process arrow B, the spreadsheet service 210 can make a request to the data retrieval service 218 hosted by the data store manager 216. The request shown by process arrow B can be related to the request shown by process arrow A. For example, the spreadsheet service 210 can perform as a communications conduit, and can reformat and relay requests. The request, for example, may be a request for keyword-related data for an advertising program.

As shown by process arrow C, the data retrieval service 218 can return requested data to the spreadsheet service 210. The returned data, for example, can be retrieved by the data retrieval service 218 from the data store 220 by using one or more data identifiers (e.g., data record keys, record modification date ranges, query parameters, etc.) associated with a data request. The returned data, for example, may be advertising program related data (e.g., keywords, destination URLs, bid amounts, match types, statuses, etc.) and data identifiers (e.g., data record keys, record modification timestamps, data group information, etc.).

As shown by process arrow D, the spreadsheet service 210 can pass the data returned by the data retrieval service 218 to the macro control module 212, and may also pass control information or meta data with the data. In some implementations, the returned data can be reformatted by the spreadsheet service 210 to prepare the data for presentation by a display document. For example, the spreadsheet service 210 can convert non-string data types (e.g., objects, enumerations, money, etc.) to string representations. In some implementations, the spreadsheet service 210 can use one or more APIs provided by the macro control module 212 to invoke the module 212 to instantiate a new display document and to populate the display document. For example, the spreadsheet service 210 may request that the macro control module 212 create a spreadsheet document, and may request that the module 212 populate the spreadsheet document with formatted advertising program related data. In some implementations, the created and populated spreadsheet document can be provided to the client application 202 using the spreadsheet server 214.

As shown by process arrow E, the macro control module 212 can inform the spreadsheet service 210 upon populating the display document. For example, the macro control module 212 can send a message to the spreadsheet service 210 after setting advertising program related data values in the spreadsheet document. In some implementations, the macro control module 212 can inform a component in the system 200 when data population has initiated, and such information can include a timestamp. In some implementations, the macro control module 212 can inform a component in the system 200 when data population has completed. In some implementations, the macro control module 212 can provide a key associated with a created or populated display document, so that other applications can provide the key to the spreadsheet server 214 in order to identify the document that they would like the spreadsheet server 214 to perform operations on.

As shown by process arrow F, the spreadsheet service 210 can provide the basic data view 204 with a document key associated with the created display document. For example, the document key can enable a component in the system 200 to retrieve a display document (e.g., the spreadsheet document including advertising program related data) from the spreadsheet server 214.

As shown by process arrow G, the basic data view 204 can provide the embedded spreadsheet 206 with the document key. For example, the basic data view 204 may use any appropriate kind of cross-data communication technique to provide the document key. In some implementations, the basic data view 204 can store the document key in the client application 202. For example, the document key may be stored as an Internet cookie associated with a web browser.

As shown by process arrow H, the embedded spreadsheet 206 can use the document key to retrieve data from the display document from the spreadsheet server 214. For example, advertising program-related data associated with the spreadsheet document on the spreadsheet server 214 may be loaded into the embedded spreadsheet 206. In some implementations, once a document key is created for a display document, the same key can be used by the client application 202 for subsequent data manipulation sessions.

As shown by process arrow I, a user can interact with the embedded spreadsheet 206. For example, a user may add, edit, update, and delete advertising program related data associated with the embedded spreadsheet 206. Spreadsheet functions such as copying down and copy/past (to name a couple of examples) may be used to enable bulk data edits. In some implementations, a user of the embedded spreadsheet 206 may sort, filter, or search spreadsheet data. In some implementations, user interactions with the embedded spreadsheet data 206 can be synchronized in real time with the associated display document stored on the spreadsheet server 214. At this point, the user has manipulated data that was retrieved from the data store 220, but the data has not yet been saved back to the data store 220, and the changes are reflected only on the spreadsheet server 214.

FIG. 2B shows the same system 200 as FIG. 2A, but at a later point in time, when a subsequent data edit request has been made. The processes associated with that request are shown by a series of lettered process arrows A-I. As before, this example process shows the editing of data related to an on-line targeted advertising program using an embedded spreadsheet document; however, other kinds of data may be edited and other kinds of Internet-accessible documents may be used for data presentation and editing. The particular operations discussed here may be invoke, for example, when an advertiser has started reviewing data for their advertising program, but has decided that they would like to review a different range of data that has not yet been retrieved from the data store 220.

As shown by process arrow A, the basic data view 204 can make a request to the spreadsheet service 210 hosted by the main data application 208. The request can include a document key associated with a previously edited display document. For example, the previously edited display document can be the spreadsheet document including advertising program related data as described in FIG. 2A. The document key may be supplied by the client application 202. For example, the document key may be retrieved by the client application 202 from a data file, such as a web cookie accessible by a browser. As another example, the document key may be retrieved from a key repository hosted on a computer device running the client 202 or a key repository hosted on another server in the system 200. The request may also include a request for data (e.g., keyword-related data for an advertising program) and a display medium (e.g., a spreadsheet document.)

As shown by process arrows B and C, a request and response from the data retrieval service 218 can be made via the spreadsheet service 210. For example, data retrieval by the spreadsheet service 210 upon a primary edit (shown by process arrows B and C in FIG. 2A) and a subsequent edit (shown here) may be similar.

As shown by process arrow D, the spreadsheet service 210 can pass the data returned by the data retrieval service 218 to the macro control module 212 along with the document key. In some implementations, the retrieved data can be formatted by the spreadsheet service 210. In some implementations, the spreadsheet service 210 can use one or more APIs provided by the macro control module 212 to instruct the module 212 to locate a previously created data display document and propagate the document with data. For example, the previously created display document may be the spreadsheet document associated with advertising program data located on the spreadsheet server 214. The data used for propagating the spreadsheet document, for example, may be the data retrieved from the data retrieval service 218 and formatted by the spreadsheet service 210.

As shown by process arrow E, data can be automatically propagated to the embedded spreadsheet 206. For example, because the display document (e.g., the spreadsheet document including advertising program data) may already be associated with the embedded spreadsheet 206 in the client application 202, in some implementations, the data propagation process upon a subsequent edit can be asynchronous with other operations of the system 200. In some implementations, a timestamp identifying a time when the data propagation process has been initiated can be associated with the embedded spreadsheet 206. As shown by process arrow F, the macro control module 212 can inform the spreadsheet service 210 when the data propagation process to the embedded spreadsheet 206 has completed.

As shown by process arrow G, the spreadsheet service 210 can return the document key to the basic data view 204. Although, in some implementations, the basic data view 204 may already have a copy of the document key, returning the key can be a mechanism for informing the basic data view 204 that data propagation to the embedded spreadsheet 206 has completed. In some implementations, the basic data view 204 can use this information to control user access to the embedded spreadsheet 206 while it loads. For example, as shown by process arrow H, the basic data view 204 can make the embedded spreadsheet visible. Other methods of restricting user access to the embedded spreadsheet 206 can include locking the spreadsheet 206 while providing a visual indicator associated with a locked status, or allowing a user to interact with loaded spreadsheet rows while blocking access to partially loaded rows, to name a couple of examples.

As shown by process arrow I, a user can interact with the embedded spreadsheet 206. For example, user interaction with the embedded spreadsheet 206 upon a primary edit (shown process arrow I in FIG. 2A) and a subsequent edit (shown here) may be similar.

Figure 2C:
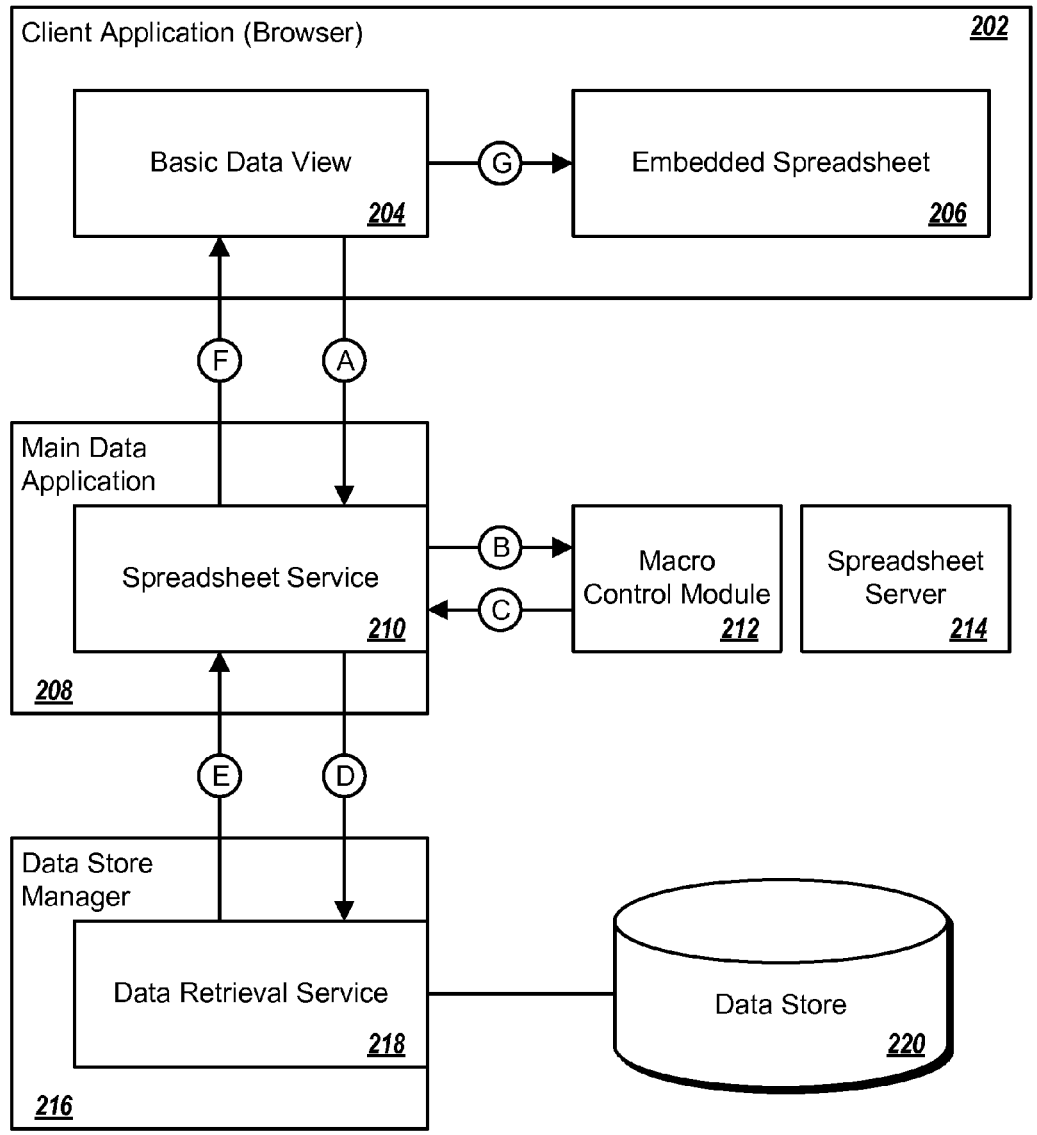
FIG. 2C is a schematic diagram that shows information flow for saving changes in a spreadsheet using on-line applications.

FIG. 2C again shows the system 200 at a different point in time, this time upon the selection by a user to save changes that they have made to a spreadsheet. The example process is indicated by arrows A-G in the figure. In some implementations, a save operation performed in the system 200 may be analogous to a save operation performed in the system 100 by a user interacting with the save button 118 associated with the container document 112. For example, in the system 200, a save operation may be triggered by a user interacting with the client application 202. Again, while this example is in the context of an on-line targeted advertising program, other implementations may also be used.

As shown by process arrow A, the basic data view 204 can initiate a save operation. For example, after interacting with a display document (e.g., performing edits, adds or deletes to advertising program data included in a spreadsheet document) a user may elect to save the document. A save operation, for example, may be triggered by a user clicking a button associated with the client application 202. In some implementations, the basic data view 204 can be programmed to handle the button click. For example, the basic data view 204 may recognize the button click and send a save request to the spreadsheet service 210. In some implementations, periodic saves may be performed by the basic data view 204, for example, by monitoring a timer control.

As shown by process arrow B, the spreadsheet service 210 can process the save request and generate a request from the macro control module 212 to retrieve changes made to the embedded spreadsheet 206 since the last time data was propagated to the embedded spreadsheet 206. For example, a timestamp related to the time that the embedded spreadsheet 206 was last populated can be associated with the spreadsheet 206 and can be used by the macro control module 212 for determining changes to spreadsheet rows or cells. Control data, for example, a hidden modification timestamp, can be associated with editable spreadsheet data upon a user edit. For example, a user of the embedded spreadsheet 206 may perform a bulk edit operation on a column of data, such as a column listing bid amount information. In the present example, the embedded spreadsheet 206 may associate a modification timestamp indicating that the column, or each of the cells included in the column, or all of the rows in the spreadsheet, were edited at a certain time. By comparing the spreadsheet data population timestamp with the data modification timestamp(s), for example, the macro control module 212 or the spreadsheet server 214 may determine which spreadsheet data values have been modified since the last time data was propagated to the embedded spreadsheet 206. As another example, one or more flags may be maintained by the embedded spreadsheet 206 indicating whether a data or spreadsheet element is "dirty" (has been edited) or "clean" (has not been edited).

As shown by process arrow C, the macro control module 212 can return data changes made to a data display document. For example, cell values modified by a user of the embedded spreadsheet 206 (e.g., modifications to bid amounts associated with an advertising program, etc.) can be provided by the macro control module 212 to the spreadsheet service 210. In some implementations, the spreadsheet service 210 can map the data associated with the document to corresponding entities in the data store 220. For example, the spreadsheet service 210 may determine that a column included in a spreadsheet document (e.g., a spreadsheet column for bid amounts) corresponds with a field included in a table managed by the data store 220.

As shown by process arrow D, the spreadsheet service 210 can send the mapped data changes to the data retrieval service 218. For example, the spreadsheet service 210 may indicate to the data retrieval service 218 that a set of values associated with bid amounts for a particular advertising program are to be updated in the data store 220. The data retrieval service 118 can perform a validation process on the mapped data changes before attempting to save the changes to the data store 220. If one or more data elements pass the validation process, for example, the data retrieval service 218 can update the data store 220 with mapped changes. If one or more data elements fail the validation process, for example, the data retrieval service 218 can compile a list of errors associated with the failed validation. For example, a subset of bid amounts modified in the embedded spreadsheet may fall outside of a required range, and these bid amounts may fail a validation process performed by the data retrieval service 118.

As shown by process arrows E and F, the data retrieval service 218 can return the list of errors to the spreadsheet service 210, and the spreadsheet service 210 can communicate the list of errors to the basic data view 204. If no errors were determined during the data validation process, for example, the error list may be empty. As another example, one or more designated codes or messages may be provided instead of or in addition to the empty error list.

As shown by process arrow G, in the case of no validation errors, the basic data view 204 can hide the embedded spreadsheet 206, indicating a successful save. In some implementations, a successful save may be indicated to a user by another technique, such as by displaying a message, for example (e.g., "changes saved successfully"). If validation errors are returned to the basic data view 204, the errors can be presented to a user such that the user may visually identify the errors, fix the errors, and attempt to re-save the data display document. For example, if a subset of cells in the embedded spreadsheet 206 are determined to include bid amounts falling outside of a required range, those cells may be superimposed with a visual indicator, such as a color or border distinguishing invalid cells from valid ones. In some implementations, instructions pertinent to fixing data validation errors can be presented to a user, for example in the form of a tool tip or other text area that may be displayed when the user interacts with the invalid cells.

The mechanisms that show the validation errors may be provided, for example, from the basic data view 204 to the embedded spreadsheet, such as by using cross-domain communication techniques in appropriate circumstances. Also, such exception data may be provided by the spreadsheet service 210 to the spreadsheet server 214 (along with a document key), which may then change the manner in which the spreadsheet is displayed to a user.

Figure 3A:
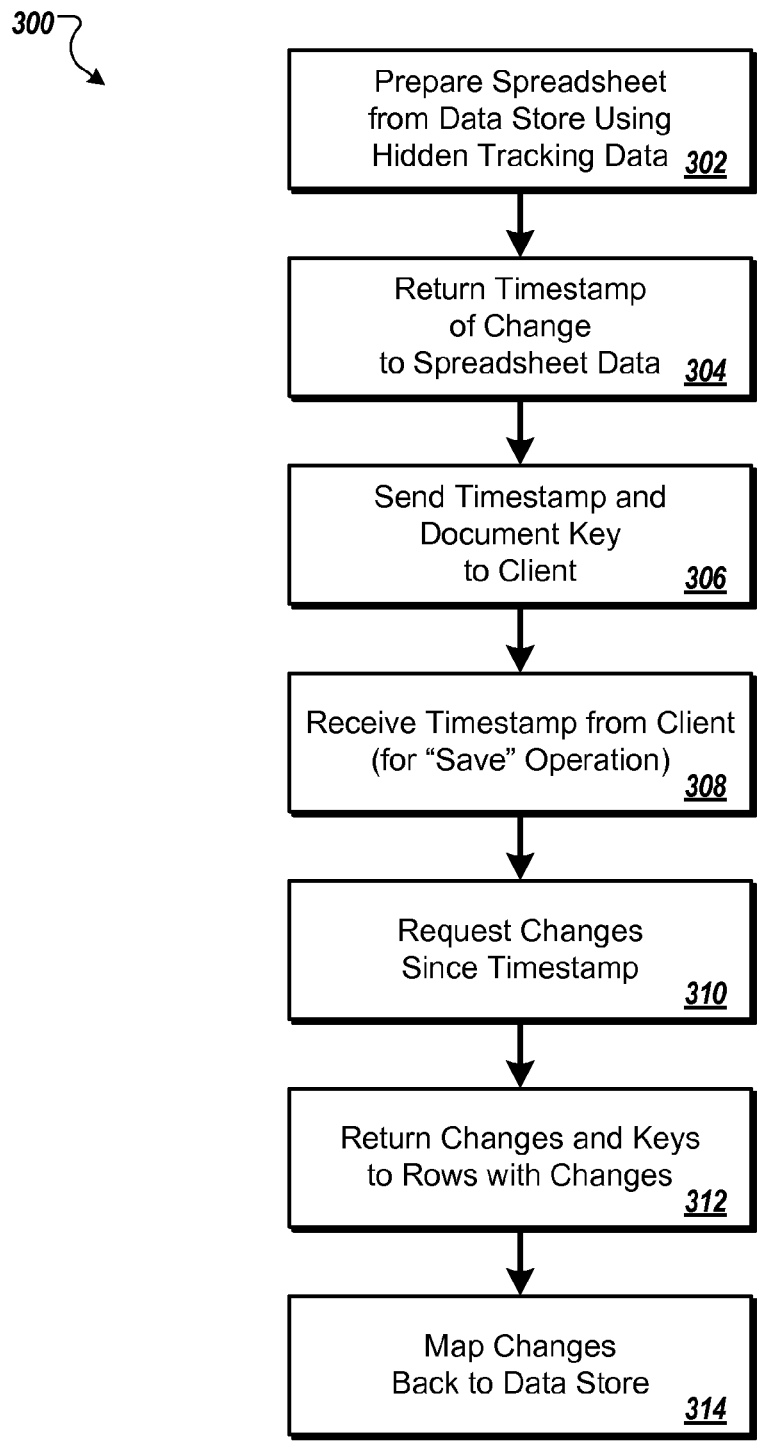
FIG. 3A is a flow chart showing actions for tracking changes in a network-accessible document.

FIG. 3A is a flow chart 300 showing actions for tracking changes in a network-accessible document. In some implementations, actions represented in the flow chart 300 may be performed by a system such as the system 100 as shown in FIG. 1. The tracking of changes in a spreadsheet including data associated with an online storefront is described here; however, other kinds of network-accessible documents may be used, and other kinds of data may be updated.

The process begins in this example at box 302, where spreadsheets are prepared from a data store using hidden tracking data. For example, a vendor may make a request for a list of product data (e.g., product descriptions, prices, discounts, available quantities, etc.) related to available products (e.g., baseballs, bats, gloves, etc.) to be displayed in an editable spreadsheet displayed in a frame in a web browser application. Relevant data may be retrieved from a data store and used to populate the spreadsheet. For example, spreadsheet rows and columns may be based on database table rows and columns. The spreadsheet may contain hidden columns and cells for each row including metadata for tracking and identifying row data. Additionally, the spreadsheet itself may include hidden metadata associated with the spreadsheet. Such metadata may include keys, modification timestamps, and validation rules, to name a few possibilities. For example, data keys corresponding to each row in the spreadsheet (e.g., a data key for baseballs, another for bats, another for gloves, etc.) can be included in hidden spreadsheet columns.

The request may be made from a browser to a main data server sub-system, which may retrieve the data. The main data sub-system may then pass the data to a separate sub-system on separate servers, including servers that communicate over a network from a different domain than the domain of the main data sub-system. Such other sub-system may operate to prepare a document, and pass whatever data it receives in a proper format into the document, such as a spreadsheet.

One or more timestamps associated with changes to spreadsheet data can returned at box 304. For example, modification timestamps corresponding to each row in the spreadsheet (e.g., a modification timestamp associated with the last change to baseball data, another for bats, another for gloves, etc.) can be included in hidden spreadsheet columns. As another example, a timestamp associated with a previous change to the spreadsheet itself may be included in a hidden spreadsheet location, or sent from a spreadsheet application to a data application.

The timestamp and document key can be sent to the client at box 306. As the vendor interacts with the spreadsheet, one or more modification timestamps can be updated. For example, as the vendor edits the spreadsheet row that lists baseballs, and changes the number of available units from 100 to 1000, the spreadsheet may update the hidden modification timestamp for that row to reflect the time of the data change. The vendor may save changes to the spreadsheet when the editing session is complete. For example, the vendor can initiate the save operation by clicking a "save" button associated with the spreadsheet, such as a save button on a portion of the spreadsheet that is served by a data application that is separate from a spreadsheet application that updates the spreadsheet.

At box 308, a timestamp associated with the spreadsheet can be received from the client. For example, a server hosting spreadsheet functionality can receive the timestamp related to the time of loading of the spreadsheet, and in certain embodiments, can receive the information from a separate data application that communicates with a web page that hosts the spreadsheet. Changes since the timestamp can be requested at box 310. For example, an application can compare the time that the spreadsheet had loaded (e.g., the beginning of the editing session) with the modification times for each row in the spreadsheet. Rows having a modification time more recent than the loading time may be considered to have changed. For example, the number of available units for baseballs may be determined to have changed.

At box 312, changes, and keys to rows with changes, can be returned. For example, a server application that handles spreadsheet functionality can return data changes and data keys to a server that handles access to a data store. At box 314, changes can be mapped back to the data store. For example, using the returned data key, a server application that handles access to the data store can determine that the modified number of available units is applicable to baseballs, and the server application can update the data store to reflect the change.

In this manner, a vendor can be provided with the ability to interact with and edit data that is stored in a large data store of formatted data. The user can do so using a familiar spreadsheet application that they might otherwise employ to keep their own checkbook via an on-line service that is associated with the service discussed here (e.g., the services may be provided by the same organization). The vendor may thus be previously familiar with the particular spreadsheet program and may thus find it convenient to edit his or her vending information using the familiar interface. As a result, the work of the vendor is made easier, and the information provider can more easily add a happy customer.

Figure 3B:
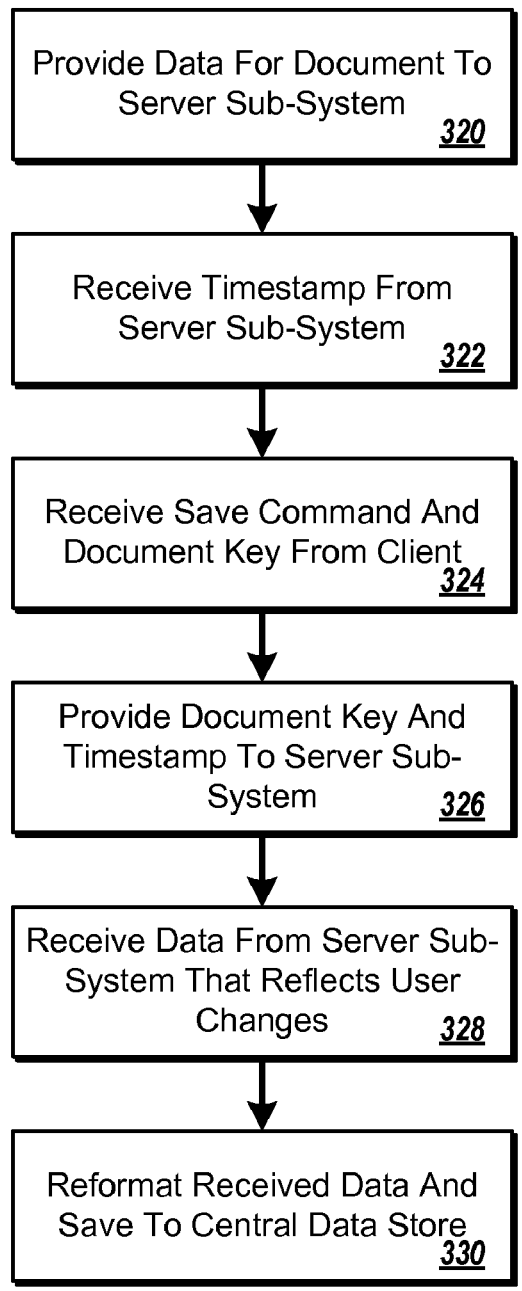
FIG. 3B is a flow chart showing actions by which a data sub-system may interact with other components to provide spreadsheet data to a browser.

FIG. 3B is a flow chart showing actions by which a data sub-system may interact with other components to provide spreadsheet data to a browser. The process begins at box 320, where a data sub-system (which may be the same as or similar to data server 104 in FIG. 1) provides data for a document to a server sub-system such as a presentation server sub-system (which may be the same as or similar to spreadsheet server 108 in FIG. 1) that includes functionality for presenting spreadsheets on web pages and for interacting with user manipulation of the spreadsheets. The provision of the data may have been triggered by the user indicating what sort of data they would like to review, such as by the user entering parameters for the data (e.g., by listing date ranges, product ranges, search terms or other parameters).

At box 322, the data sub-system receives a timestamp from the presentation sub-system, and may also receive a document key or other mechanism for identifying a document that has been opened by the presentation sub-system and made available to the browser, such as via a frame in a web page being displayed by the browser. The timestamp may represent a time at which known data has been provided to the presentation server sub-system, so that changes to such data may be tracked accurately.

After some time, the data server subsystem may receive a command and a document key from the client device (box 324). The command may include, for example, a command to save changes that the user of the client has made to the document. Such changes may have been occurring between the client and the spreadsheet server sub-system without the data server sub-system being notified in any manner of the changes, and the data server sub-system not having to save state information for the client or the spreadsheet. The state may instead be reflected by the timestamp that the client returns to the data server sub-system with the command. Alternatively, the state information may be stored with the servers, and the provision by the client of a document identifier such as a document key may trigger the retrieval of such information.

At box 326, the document key and timestamp may be provided by the data server sub-system to the presentation server sub-system. The timestamp may take the form, for example, of a literal time representation (e.g., with a date, hours, minutes, and seconds) or may take other appropriate forms that permit the systems to determine what changes have been made to the document since the last time the changes were permanently recorded by the system. The data server sub-system may then wait while the presentation server sub-system uses the provided information to determine which document is to be saved, to identify the changes that have been made to the document since it was last called up or saved, and to return data to the data server sub-system that reflects those changes.

At box 328, the data server sub-system receives the data, and at box 330, it reformats the data and saves it to a central data store. For example, the presentation server sub-system may communicate according to a particular API and may define data types or arrangements of data that differ from those defined by a database that operates the data store. The data server sub-system, in this step, may thus act as an translator for the data. In addition, the data server sub-system may perform validation checks on the data, and may cause any questionable or invalid data to be highlighted on the web page for the user, either by communicating with the web page directly or by communicating through the presentation server sub-system.

Figure 3C:
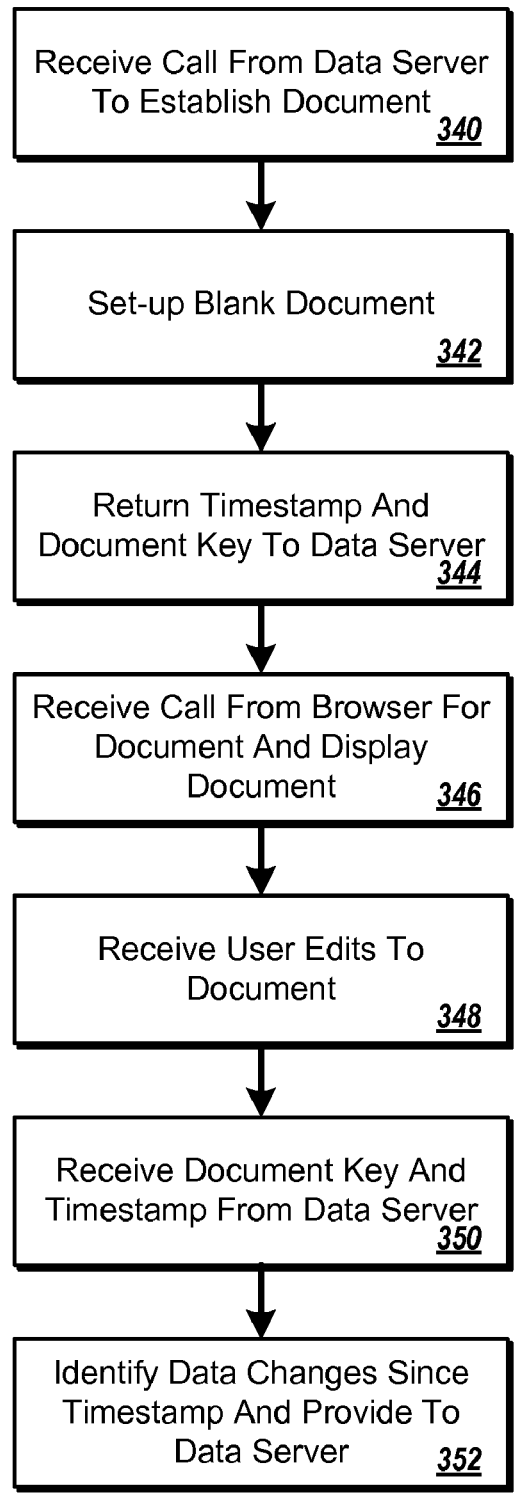
FIG. 3C is a flow chart showing actions by which a document presentation sub-system may interact with other components to provide spreadsheet data to a browser.

FIG. 3C is a flow chart showing actions by which a document presentation sub-system may interact with other components to provide spreadsheet data to a browser. This process is similar to those discussed above, including in FIG. 3C, but is described here from the viewpoint of the presentation server sub-system.

The process begins at box 340, where a call from the data server sub-system is received and requests that a document be established. The presentation server sub-system may then establish an empty document, such as a spreadsheet, and may serve that document, either immediate or after receiving a request for the document from a frame in a web page that has been served by the data server sub-system or an associated sub-system (box 342). The sub-system may record the time at which the document was created and may pass a timestamp and a document key to the data server sub-system. The presentation server sub-system may then wait. At box 346, the presentation server sub-system receives a request from the browser at the client to display the document. Before or at the same time, the presentation server sub-system may have been provided with data for populating the document, such as data passed by the data server sub-system at the same time as or after the data server sub-system provided the call to establish the document.

The spreadsheet server sub-system then may interact with the user via standard mechanisms for the sub-system (box 348). For example, the user may add, delete, edit, and rearrange data in the document, and the spreadsheet server sub-system may reflect such changes in the display provided to the user in the frame on the web page. At box 350, the presentation server sub-system receives the document key and timestamp from the data server sub-system (box 350). Such data may also be accompanied by a command that causes the presentation server sub-system to identify changes to the document in the interim since the generation of the timestamp. For example, the presentation server sub-system may have marked certain fields when changes were made to data associated with those fields (and the markings may be removed each time the document is saved), may have provided hash-like representations of the data in the fields and may check those representations to identify changes that may have occurred, or may timestamp fields as they are changed. Such changes may be translated into a data group that may be sent back to the data server sub-system (box 352) so that the data server sub-system may reflect the changes in a central data store.

Figure 4:
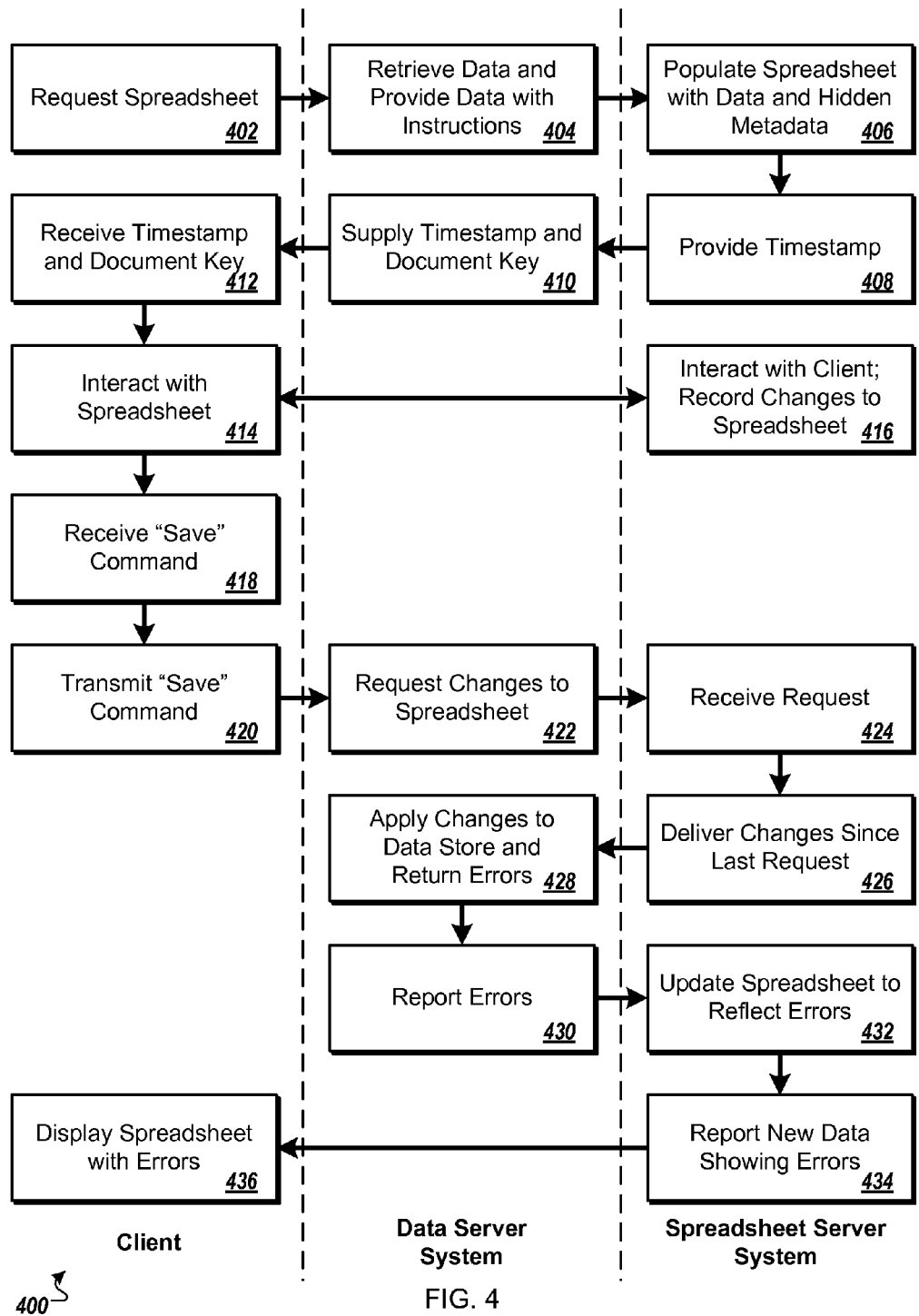
FIG. 4 is a swim lane diagram showing interaction by a user at a client device with data obtained by a data server system, and presented in a spreadsheet by a spreadsheet server system.

FIG. 4 is a swim lane diagram 400 showing interaction by a user at a client device with data obtained by a data server system, and presented in a spreadsheet by a spreadsheet server system. In general, the particular actions are shown in this example as being performed by a particular structural component, and the process generally shows steps for interacting with a user via a browser-presented spreadsheet and for reporting errors in changes that a user may make to the spreadsheet. In some implementations, operations represented in the swim lane diagram 400 may be performed by a system such as the system 100 as shown in FIG. 1. Interaction with a spreadsheet and a spreadsheet server including data associated with an online storefront is described here; however, other kinds of network-accessible documents may be used, and other kinds of data may be updated.

At box 402, a client (e.g., the client 102) can request a spreadsheet. For example, a vendor may request that a list of product data (e.g., product descriptions, product codes, prices, discounts, available quantities, etc.) related to available products (e.g., baseballs, bats, gloves, etc.) be displayed in an editable spreadsheet. At box 404, a data server system (e.g., the data server 104) can retrieve data (e.g., product data) and provide the data with instructions. For example, the data can be prepared for display in a spreadsheet. Data types may be converted and metadata (e.g. keys, modification timestamps, validation rules, presentation rules, etc.) can be associated with the data.

At box 406, a spreadsheet server system (e.g., the spreadsheet server 108) can populate the spreadsheet with data and hidden metadata. Editable data such as product descriptions, prices, discounts, and available quantities, to name a few examples, may be loaded in visible, editable, spreadsheet columns. Non-editable data such as product codes, to name an example, may be loaded in visible, non-editable spreadsheet columns. For example, editable and non-editable columns may be determined and set by the spreadsheet server system based on presentation rules included in the metadata. Metadata such as data keys, modification timestamps, validation rules, and presentation rules, to name a few examples, may be loaded in hidden columns.

At box 408, the spreadsheet server system can provide a timestamp. For example, a timestamp can be provided that is associated with the time of populating the spreadsheet. The data server system can supply the timestamp and document key at box 410, and the client can receive the timestamp and document key at box 412.

At box 414, the client can interact with the spreadsheet. For example, the vendor can use a bulk spreadsheet operation to change the discount for all products to 25%. The spreadsheet server system can interact with the client and record changes to the spreadsheet at box 416. For example, as a bulk change to the discount rate had been performed by the vendor affecting all rows in the spreadsheet across a single column, the spreadsheet server system may update modification timestamp metadata associated with all the data rows in the spreadsheet, or may update metadata associated with the discount column, or may update metadata associated with the spreadsheet document itself.

Other changes, like the reordering of rows in the spreadsheet, may not be associated with a change, and so the metadata may not be updated when such an operation occurs. In particular, the data may be stored in a data store regardless of the order in which it may be displayed, so it may be desirable to not store such changes, which would otherwise result in the expenditure of substantial resources to track such changes and save all of the rearranged data to the data store.

At box 418, the client receives a "save" command. For example, upon completing an editing session, the vendor may interact with a button included in a client application associated with computer code that can trigger a save operation. As another example, the client may trigger periodic saves. The "save" command can be transmitted by the client at box 420.

At box 422, the data server system can request changes to the spreadsheet. For example, changes since the last time data had been loaded into the spreadsheet, or changes since the last time a save operation had been performed, or changes since the previous request, may be requested from the spreadsheet server system. The request can be received by the spreadsheet server system at box 424. At box 426, the spreadsheet server system can deliver changes since the last request. For example, timestamps associated with spreadsheet loading, spreadsheet save requests, or spreadsheet change requests may be compared with spreadsheet modification timestamps for determining data changes.

At box 428, the data server system can apply changes to a data store (e.g., the data store 106) and return errors. Validation rules, for example, may be applied to data to determine errors. For example, a business logic application running on the data server system may apply business logic or validation rules to determine that the maximum allowable discount for gloves is 10%. A message for informing the vendor of the rule may be generated by the business logic application. Errors can be reported by the data server system to the spreadsheet server system at box 430. For example, the data server system may send one or more error messages along with instructions for associating the error messages with data on the spreadsheet. Alternatively, the errors may be reported by the data server system directly to the client.

The spreadsheet can be updated by the spreadsheet server system to reflect errors at box 432, the spreadsheet server system can report new data showing errors at box 434, and the client can display the spreadsheet with errors at box 436. For example, the spreadsheet can provide the spreadsheet cell associated with discounts for gloves with a visual indicator, such as a distinguishing color or border, to name a couple of possibilities. The error message may also be associated with the cell, for example, as a tool tip or message bubble to be displayed when the vendor interacts with the cell.

Figure 5:
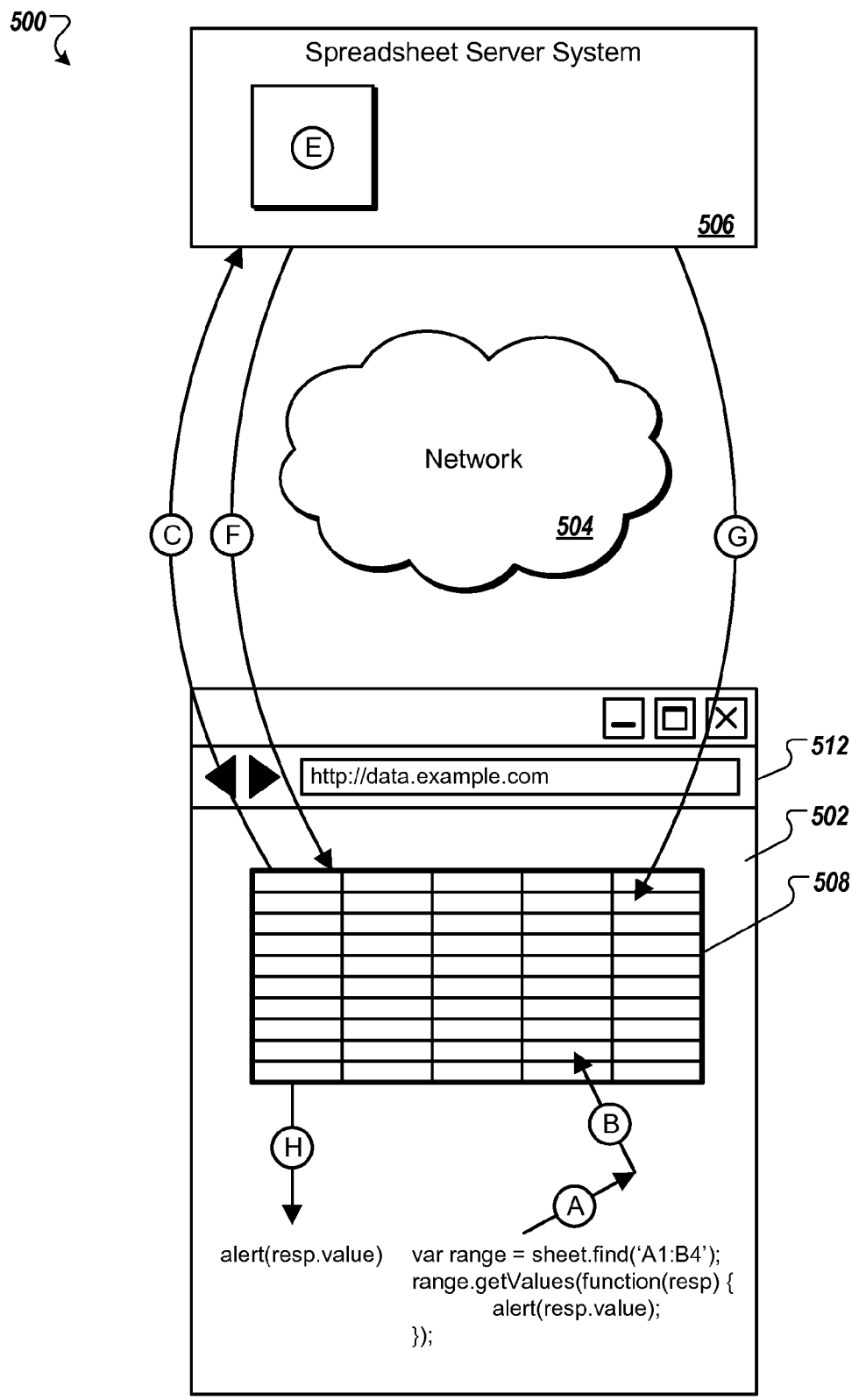
FIG. 5 is a schematic diagram showing a spreadsheet embedded in a web page.

FIG. 5 is a schematic diagram showing a spreadsheet embedded in a web page. In general, the spreadsheet can be served from a first server sub-system and the web page 502 around the spreadsheet can be served by a separate server subsystem. The two sub-systems, as noted above, can serve information from different web domains.

In the figure, a system 500 includes a web page 502 and a spreadsheet server system 506 communicating over a network 504 (e.g., the Internet). In some implementations, components included in the system 500 may run on computing devices and servers similar to the computing devices and servers shown in FIG. 1. For example, the web page 502 may be displayed in a web browser 512 running on a client similar to the client computing device 102, and the spreadsheet server system 506 may run on a server similar to the spreadsheet server 108. In some implementations, the web page 502 can be directed to an Internet domain different than the Internet domain associated with the spreadsheet server system 506. For example, the web page 502 may be directed to a domain such as "data.example.com" and the spreadsheet server system 506 may be associated with a domain such as "spreadsheet.example.com".

In general, the system 500 can provide computer code to a client device for interacting with and managing an embedded document at the client device. For example, the web page 502 may include an embedded spreadsheet document 508 in an iframe. The web browser 512 can download computer code from the spreadsheet server system 506 enabling the web page 502 to interact with the embedded spreadsheet document 508. In some implementations, the computer code may also enable cross-domain communications between the web page 502 and the embedded spreadsheet document 508.

In some implementations, the computer code can be included in a portable program module (e.g., a web gadget or widget) that may be included as an add-on for the web browser 512. For example, the portable program module may provide an API for a web scripting language (e.g., JavaScript, VBScript, etc.) executed by the web browser 512. In some implementations, the API can include API stubs that define the interface. For example, when a web developer instructs the API to create a range object associated with the embedded spreadsheet document 508, the API may create a nearly stateless stub object having a reference to data on the spreadsheet server system 506. The range object, for example, may recognize its start and end rows and columns and its associated spreadsheet document. Other state information may be maintained on the spreadsheet server system 506. For example, when an API method is invoked on a client-side object (such as the range object), the web browser 512 may create a representation of the invoked method and send the representation to the spreadsheet server system 506.

Information flow in the system 500 related to an invocation of an API method is shown by a series of lettered process arrows A-G. Such interactions between subsystems in a broader system may (e.g., between data server 104 and spreadsheet server 108) can occur via mechanisms such as remote procedure calls, and may occur over a back-end network operated by a service provider rather than over a main network like the internet.

As shown by process arrow A, code may be executed within the web page 502 for interacting with the embedded spreadsheet document 508. For example, a range object may be instantiated and a method for retrieving values from the spreadsheet may be invoked. The method, for example, may take its arguments and its name and create a proto representation (a compact representation) of a macro command to be executed by the spreadsheet server system 506.

As shown by process arrow B, a cross-domain communication technique can be used to pass the macro command from the web page 502 to the embedded spreadsheet document 508. Any appropriate kind of cross-domain communication technique may be used, including, but not limited to, JavaScript Object Notation with Padding (JSONP), a JavaScript Client Library, a relay file served from a client domain, or a combination of techniques. For example, to send messages from the web page 502 to the spreadsheet server system 506, communications may be tunneled through the frame containing the embedded spreadsheet document 508.

As shown by process arrow C, an instance of a dispatcher associated with the embedded spreadsheet document 508 can receive the message from the web page 502 and forward the message to the spreadsheet server system 506. In some implementations, the embedded spreadsheet document 508 may forward the message without inspecting it, and may call an executor on the client device to run the command asynchronously.

As shown by process step E, the spreadsheet server system 506 can receive and run the command. In some implementations, the spreadsheet server system 506 may convert the representation of the command, for example by using one or more deserialization libraries. For example, the spreadsheet server system 506 may run the command as a macro command. From the perspective of the spreadsheet server system 506, in some implementations, the handling of the command may be independent of its source. For example, the spreadsheet server system 506 may handle a command provided by the web browser 512 in a similar manner as if it were provided by a component running on the system 506.

As shown by process arrows F and G, the spreadsheet server system 506 can provide a response to the embedded spreadsheet document 508 while controlling the document 508. For example, if a request is made through code to update a range of cells included in the embedded spreadsheet document 508, the response (shown by arrow F) may be an Asynchronous JavaScript+XML (AJAX) response associated with the macro command, and the document control (shown by arrow G) may be a visual updating of spreadsheet contents.

As shown by process arrow H, the response value may be provided by the embedded spreadsheet document 508 to the web page 502, using a cross-domain communication technique. For example, as a range of spreadsheet values may be requested by the web page 502 from the embedded spreadsheet document 508, the values may be returned by the document 508 to the page 502.

Figure 6A:
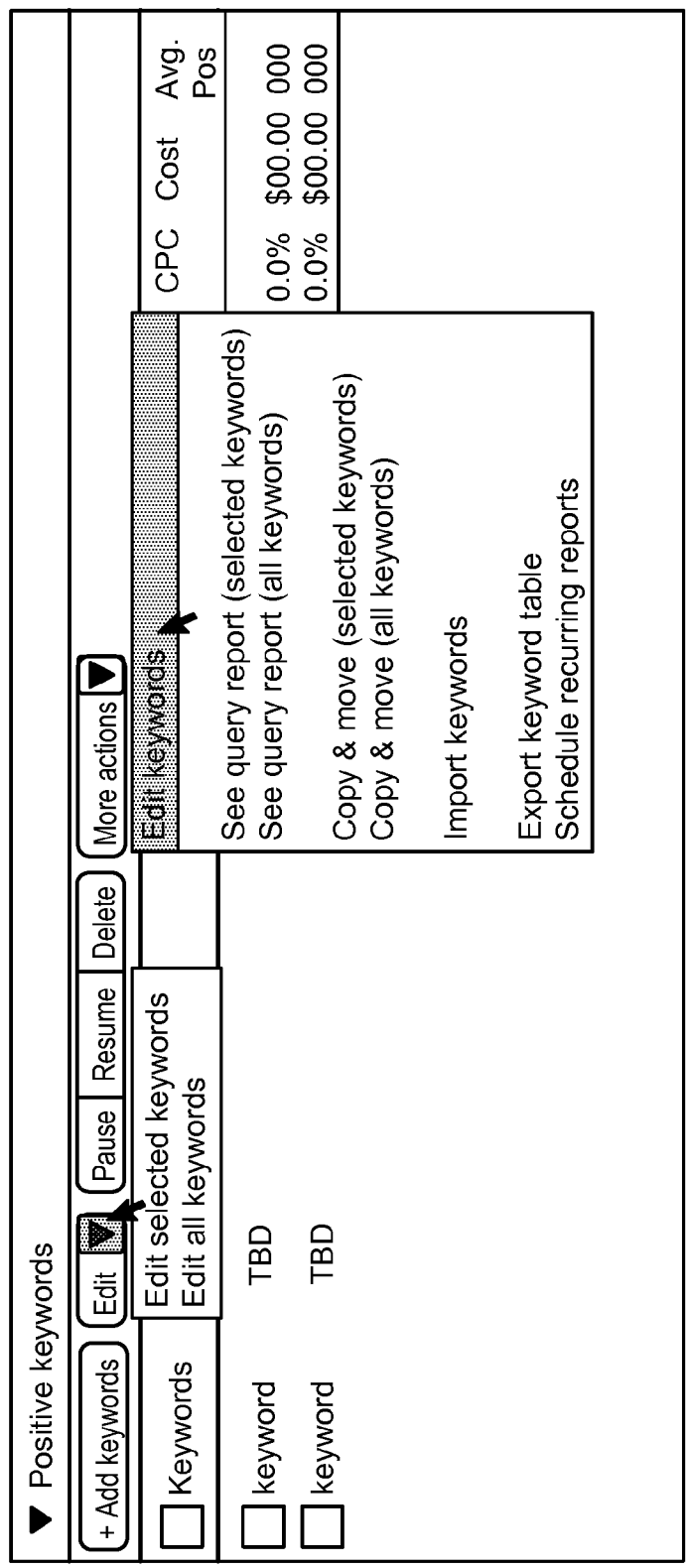

FIGS. 6A-6G are example screen shots for an advertising system that provides user interaction via a spreadsheet presentation system. FIG. 6A, for example, shows a portion of a screen in which a user, such as an advertising manager, is making menu selections from a spreadsheet, which may provide for advanced interaction using technologies such as Asynchronous JavaScript and XMP (AJAX) and related technologies. In this example, the user is taking the opportunity to choose to edit keywords associated with advertisements that the user is running with the system that has generated the data for the screen shots.

FIG. 6B shows the user selecting a particular on-line spreadsheet application for making edits to their advertising data. Other options may also be made available to the user. However, the selected option in this example, allows the user to employ a known spreadsheet interface and to easily save any changes to the data back to the service's main data stores for such data. FIG. 6B also shows part of the screen where the user has been able to edit keywords, with a "save" selection button, like the save buttons discussed above. Such an action may result in the changes being made back to the advertising system data, or may also permit the user to save the current state of the spreadsheet outside of the main data store, so that the user can come back later and continue to make changes to the data before sending the data back to the main system.

Figure 6D:
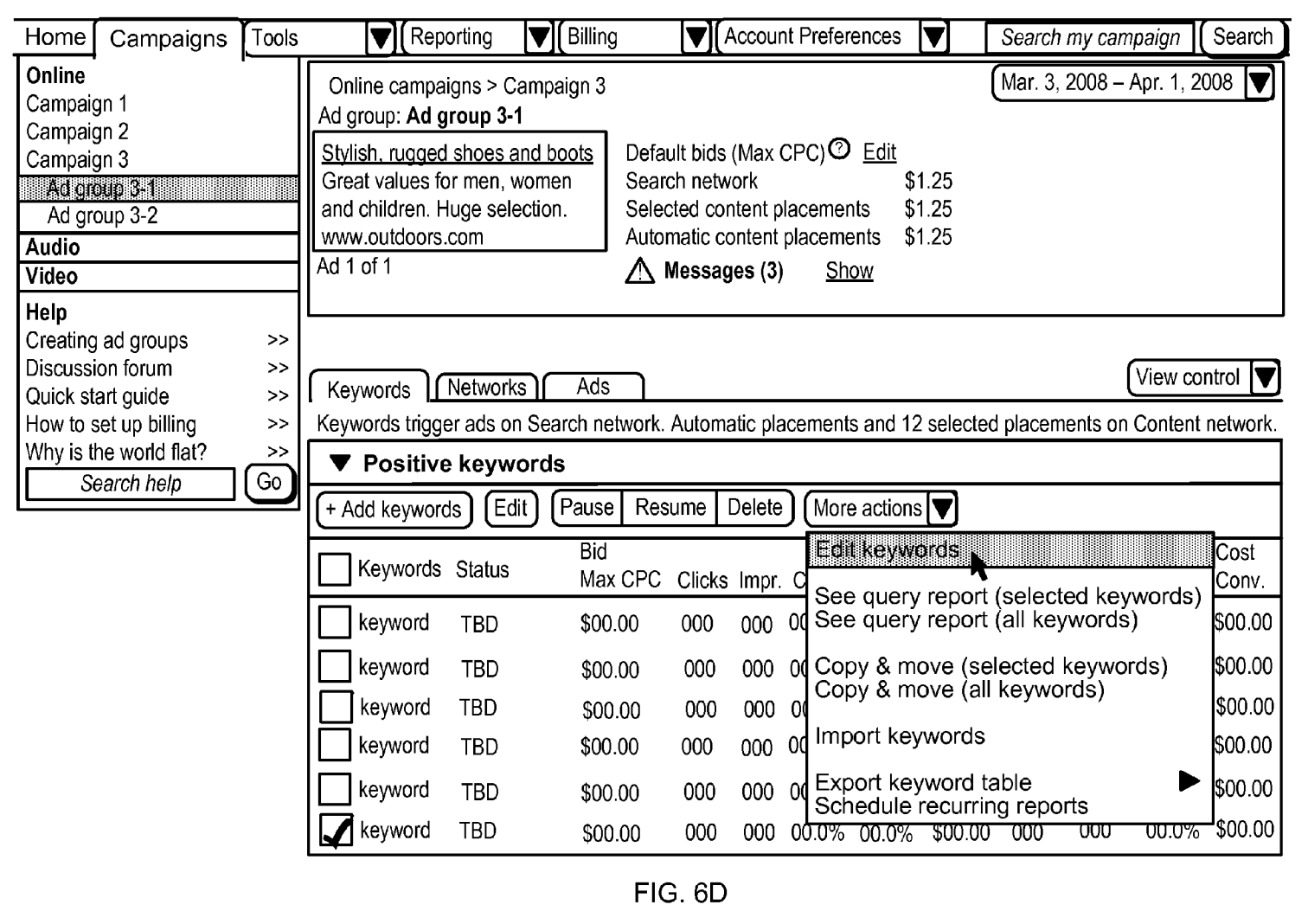

FIG. 6C shows a user in the process of editing keywords for their advertising campaigns. In this example, the user is selecting to add a keyword to a list of keywords. The user may subsequently be asked to provide a destination URL associated with the keyword and advertisement (i.e., the place that visitors will be taken if and when they click on the advertisement). The user may also identify, in a familiar manner, the maximum cost that they are willing to bid in an automatic auction in order to have their advertisement selected for display. FIG. 6D shows another instance, like that in FIG. 6A, where a user is making menu selections to edit keywords association with a large number of advertisements that the user may be managing.

FIG. 6E shows an interface by which a user can edit keywords, similar to that shown in 6C. As can be shown the editing occurs in an embedded spreadsheet (note the column letters and row numbers), which may be an embedded spreadsheet like any of those that are discussed above. In this example, the central system has performed validation on values entered by a user and has identified three validation errors. First, the user failed to identify a "match type" for the key word "bouquets of flowers." Second, the user entered a bid amount of 1,10 dollars, which is not a valid dollar amount. Third, the user entered a range of prices for another bid amount, when only a maximum bid is allowed. Such validation errors may be communicated to the user via the techniques described above, thus allowing the user to see quickly where erroneous data has been entered so that the user can fix it. In this example, the spreadsheet server might not play a role in validating the data, and instead the advertising server subsystem may performed such validation and may then pass information to the client or to the spreadsheet server system so as to identify errors.

Figure 6G:
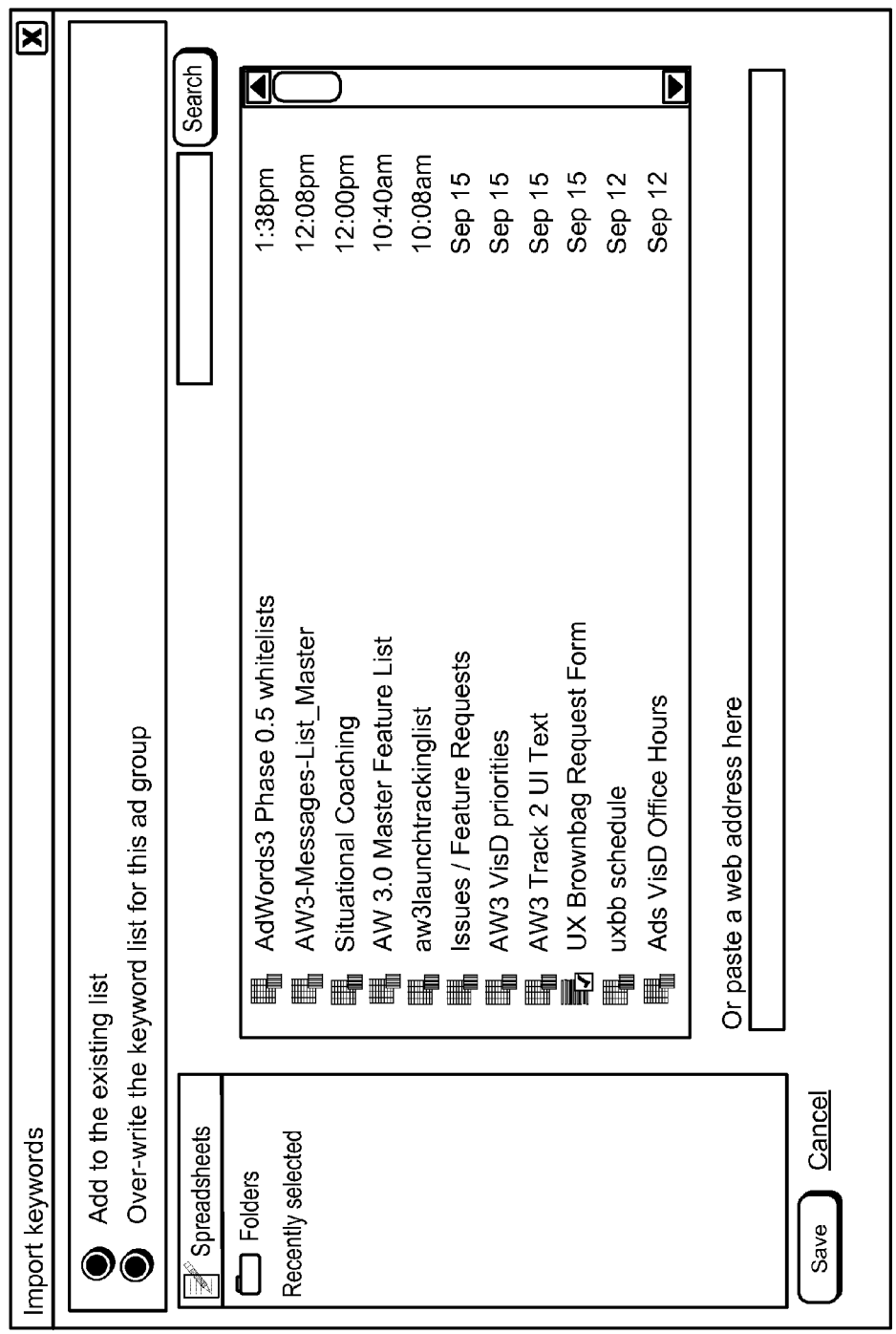

In FIG. 6F, the user has chosen to add keywords. Such actions may also be performed by embedding a spreadsheet into a page and accepting user input as described above. Separately, some user interface issues may not require the assistance of a spreadsheet program and may thus be handled directly by the advertising server system. In FIG. 6G, a separate pop-up box is shown that may be displayed as part of a user's process of adding keywords for an advertising campaign. In certain circumstances, a user may want to think up effective keywords once and then to store them where they can be redeployed as needed. Thus, for example, in this figure, the user is displayed a file access dialog box where the user can identify a keyword list that can be readily imported into a spreadsheet on which the user is currently working.

Figure 7:
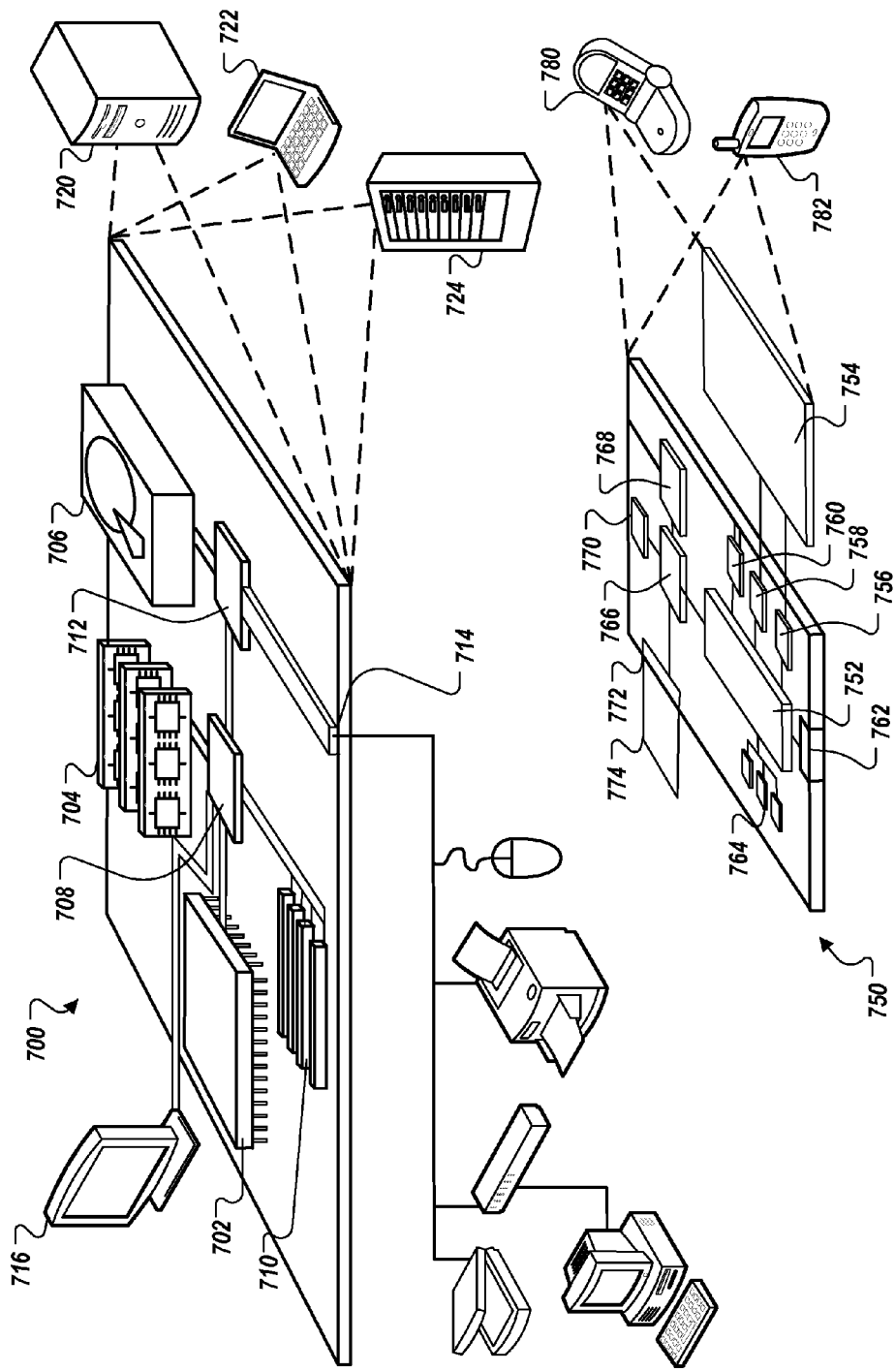
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 750 and used to update the display of the respective devices 750 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for presenting data in an on-line spreadsheet document, comprising:
    receiving at a data server sub-system, from a browser on a client computing system, a request for data stored in a central data store;
    retrieving the requested data from the central data store and providing data corresponding to the requested data to a spreadsheet presentation sub-system that is in communication with the data server sub-system and with the browser on the client computing system;
    providing a document key from the data server sub-system to the browser on the client computing system, the document key identifying the spreadsheet document and enabling the browser to request the spreadsheet document that displays the data corresponding to the requested data from the spreadsheet presentation sub-system;
    mapping changes in cells on the spreadsheet document to data structures in the central data store, the changes made in the spreadsheet document by a user of the client computing system; and
    updating information in the central data store to reflect the changes.

2. The method of claim 1, wherein the data server sub-system does not maintain state information for the spreadsheet document.

3. The method of claim 1, wherein the data server sub-system communicates with the client computing system by a web page and the spreadsheet presentation sub-system communicates with the client by a frame within the web page.

4. The method of claim 1, wherein the document key identifying the spreadsheet document is served from a domain that differs from a domain that serves the spreadsheet document.

5. The method of claim 1, receiving a save command from the client computing device and passing state information from the data server sub-system to the spreadsheet presentation sub-system.

6. The method of claim 5, further comprising receiving from the spreadsheet presentation sub-system data indicating the changes made in the spreadsheet document by a user of the client computing device, and converting the data indicating the changes to the spreadsheet document into a format for storing in the central data store, and storing the converted data in the central data store.

7. The method of claim 6, further comprising identifying with the data server sub-system errors in the data and causing the spreadsheet presentation sub-system to communicate the errors to the client computing device.

8. The method of claim 1, further comprising providing control data in columns of the spreadsheet document that are hidden from display on the client computing device, and using the control data to indicate whether a change has been made to a row of the spreadsheet document that corresponds to an instance of the control data.

9. The method of claim 8, further comprising using, with the data server sub-system, the control data to determine which rows of the spreadsheet document have been changed since a time that corresponds to the state information received from the client computing device.

10. A computer-implemented system for presenting web-based spreadsheet documents, comprising:
    a data server sub-system programmed to communicate with a client computing device and to serve one or more web pages to the client computing device; and
    a spreadsheet presentation sub-system in communication with the data server sub-system to receive data from the data server sub-system and to format the data for presentation in a spreadsheet document on one or more web pages served to the client computing device,
    wherein the data server sub-system is further programmed to retrieve data from a central data store in response to a user request from the client computing device, to provide the data to the spreadsheet presentation sub-system, to provide a document key to a browser executed on the client computing device, the document key identifying the spreadsheet document and enabling the browser to request the spreadsheet document from the spreadsheet presentation sub-system, to provide state information regarding the spreadsheet document to the client computing device, to map changes in cells on the spreadsheet document to data structures in the central data store, the changes made in the spreadsheet document by the user; and to update information in the central data store to reflect the changes.

11. The method of claim 10, wherein the data server sub-system is programmed not to retain state information about the spreadsheet document after providing the state data to the client computing device.

12. The method of claim 10, further comprising a spreadsheet presentation sub-system controller arranged to receive commands according to an application programming interface from the data server sub-system, and to cause the spreadsheet presentation sub-system to populate the spreadsheet document and to report changes to the spreadsheet document in response to the commands.

13. The method of claim 10, wherein the data server sub-system communicates with the client computing system by a web page and the spreadsheet presentation sub-system communicates with the client computing system by a frame within the web page.

14. The method of claim 10, wherein the state information comprises a time stamp, and the data server sub-system is further programmed to receive the state information in response to a user command at the client computing system to save the changes, and to provide the state information to the spreadsheet presentation sub-system.

15. The method of claim 14, wherein the data server sub-system is further programmed to receive, from the spreadsheet presentation sub-system, data indicating the changes made in the spreadsheet document by the user, to convert the data indicating the changes to the spreadsheet document into a format for storing in the central data store, and to store the converted data in the central data store.

16. The method of claim 15, wherein the data server sub-system is further programmed to identify errors in the data and communicate information regarding the errors to the spreadsheet presentation sub-system, and the spreadsheet presentation sub-system is further programmed to visually identify cells in the spreadsheet document that contain errors identified by the data server sub-system.

17. A computer-implemented system for presenting web-based spreadsheet documents, comprising:

a first server system programmed to communicate with a client computing device and a data storage system, to serve one or more web pages to the client computing device, and to provide a document key to the browser on the client computing device;

a second server system in communication with the first server system to receive data from the first server system and to format the data for presentation in rows of a spreadsheet document on the one or more web pages, wherein the document key identifies the spreadsheet document and enables the browser to request the spreadsheet document from the second server system; and means for communicating information from the data storage system to the client computing device, and for communicating changes in cells on the spreadsheet document made at the client computing device to the data storage system;

wherein the first server system is further programmed to map the changes in cells on the spreadsheet document to data structures in the data storage system, and to update information in the data storage system to reflect the changes.

* * * * *